(12) United States Patent
Zhou et al.

(10) Patent No.: US 12,483,949 B2
(45) Date of Patent: Nov. 25, 2025

(54) DELTA SIGNALING OF CELL CONFIGURATION FOR INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Junyi Li, Fairless Hills, PA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

(21) Appl. No.: 17/810,474

(22) Filed: Jul. 1, 2022

(65) Prior Publication Data

US 2024/0007914 A1   Jan. 4, 2024

(51) Int. Cl.
*H04W 36/00* (2009.01)

(52) U.S. Cl.
CPC . *H04W 36/00835* (2018.08); *H04W 36/0061* (2013.01)

(58) Field of Classification Search
CPC ............. H04W 36/0061; H04W 36/00835
See application file for complete search history.

(56) References Cited

U.S. PATENT DOCUMENTS

2022/0418002 A1* 12/2022 Dinan .................. H04W 52/22

FOREIGN PATENT DOCUMENTS

| WO | 2021066700 A1 | 4/2021 |
|---|---|---|
| WO | 2022084955 A1 | 4/2022 |
| WO | 2022091072 A1 | 5/2022 |
| WO | 2022123537 A1 | 6/2022 |

OTHER PUBLICATIONS

International Search Report and Written Opinion—PCT/US2023/026344—ISA/EPO—Oct. 11, 2023.
Mediatek Inc: "38.300 Running CR for Introduction of NR Further Mobility Enhancements", 3GPP TSG-RAN WG2 Meeting #121, R2-2300375, Type Drafter, NR_MOB_ENH2-CORE, 3rd Generation Partnership Project, Mobile Competence Centre, 650, Route Des Lucioles, F-06921 Sophia-Antipolis Cedex, France, vol. 3GPP RAN 2, No. Athens, GR, Feb. 27, 2023-Mar. 3, 2023, Feb. 17, 2023, 14Pages, XP052245022, Clause 9.2.3.X, Sub-Clauses 9.2.3.X.1 & 9.2.3.X.2 With Reference to Fig. X.

* cited by examiner

*Primary Examiner* — Brian P Cox
(74) *Attorney, Agent, or Firm* — Procopio, Cory, Hargreaves & Savitch LLP

(57) ABSTRACT

Aspects presented herein may improve the latency and efficiency of L1/L2 inter-cell mobility. In one aspect, a UE receives a configuration for a set of cells associated with a mobility of the UE, where the set of cells includes an SpCell and an SCell, where the set of cells includes a first subset of activated cells and a second subset of deactivated cells, and where at least one first cell of the set of cells is a reference cell and one or more second cells of the set of cells are associated with the reference cell. The UE receives an indication of an updated configuration for the set of cells based on a movement of the UE, where the indication of the updated configuration is received from the network entity, where the updated configuration includes at least one new cell in the set of cells.

26 Claims, 23 Drawing Sheets

```
l1L2MobilityConfig ::= SEQUENCE{
    spCellConfig           SpCellConfig ~802      OPTIONAL, Reference cell
    sCellConfig            SCellConfig ~802       OPTIONAL, Reference cell
    deltaConfig            Deltaconfig ~804       OPTIONAL, other cells
}
deltaConfig ::= SEQUENCE { ~804
    deltaConfigForspCell   DeltaConfigForspCell   OPTIONAL
    deltaConfigForsCell    DeltaConfigForspCell   OPTIONAL
}
```

SpCell/SCell Dela Configuration

Cell Group 1 ~ 1102

| Cell 1 (Reference Cell) | Cell 2 (Non-Reference Cell) | Cell 3 (Non-Reference Cell) |
|---|---|---|
| Parameter 1<br>Parameter 2<br>Parameter 3<br>⋮<br>Parameter N | Parameter 1<br>Parameter 7 | Parameter 3 |

Cell Group 2 ~ 1104

| Cell 4 (Reference Cell) | Cell 5 (Non-Reference Cell) | Cell 6 (Non-Reference Cell) |
|---|---|---|
| Parameter 1<br>Parameter 2<br>Parameter 3<br>⋮<br>Parameter Y | Same as reference cell | Parameter 1<br>Parameter 2<br>Parameter 3 |

Cell Group 3 ~ 1106

| Cell 7 (Reference Cell) | Cell 8 (Non-Reference Cell) | Cell X (Non-Reference Cell) |
|---|---|---|
| Parameter 1<br>Parameter 2<br>Parameter 3<br>⋮<br>Parameter N | Parameter 1<br>Parameter 2 | Parameter 1 |

FIG. 11

```
CellGroupConfig ::=        SEQUENCE {
    cellGroupId            CellGroupId,
    referenceCellGroup
        refereceCellGroupId    ReferenceCellGroupId
        referenceCellIdx       ReferenceCellIdx
        otherCellIdx           SEQUENCE (SIZE (1..maxNrofCells) ) OF CellIdx
        SEQUENCE {
}
```

FIG. 12

SpCell/SCell Dela Configuration

<u>Cells associated with delta configuration</u>

| Cell 1 (Reference Cell) | Cell 2 (Non-Reference Cell) | | Cell 7 (Non-Reference Cell) |
|---|---|---|---|
| Parameter 1 | Parameter 1 | | Parameter 1 |
| Parameter 2 | Parameter 2 | ... | Parameter 3 |
| Parameter 3 | Parameter 7 | | |
| ... | | | |
| Parameter N | | | |

<u>Cells not associated with delta configuration</u>

| Cell 8 | Cell 9 | | Cell 10 |
|---|---|---|---|
| Parameter 1 | Parameter 1 | | Parameter 1 |
| Parameter 2 | Parameter 2 | ... | Parameter 2 |
| Parameter 3 | Parameter 3 | | Parameter 3 |
| ... | | | ... |
| Parameter N | Parameter N | | Parameter N |

FIG. 13

```
l1L2MobilityConfig ::= SEQUENCE{
    spCellConfig         SpCellConfig       OPTIONAL, Reference cell or other cells that is not delta configured
    OtherCellList        SEQUENCE (SIZE (1.. maxNrofCells)) OF CellIndex,   OPTIONAL, Reference cell           1402
    sCellConfig          SCellConfig        OPTIONAL, Reference cell or the other cells that is not delta configured
    deltaConfig          Deltaconfig        OPTIONAL, other cells
}
```

```
SpCell/SCell Dela Configuration
Cell Group 1
Cell 1                  Cell 2 (Non-           Cell 3 (Non-
(Reference Cell)        Reference Cell)        Reference Cell)

Parameter 1             Parameter 1            Parameter 3
Parameter 2             Parameter 7
Parameter 3
    .
    .
    .
Parameter N
Cell Group 2
Cell 4                  Cell 5 (Non-           Cell 6 (Non-
(Reference Cell)        Reference Cell)        Reference Cell)

Parameter 1             Same as                Parameter 1
Parameter 2             reference cell         Parameter 2
Parameter 3                                    Parameter 3
    .
    .
    .
Parameter Y
Cell Group 3 ~ 1502

Cell 7                  Cell 8                 Cell X

Parameter 1             Parameter 1            Parameter 1
Parameter 2             Parameter 2            Parameter 2
Parameter 3             Parameter 3   · · ·    Parameter 3
    .                       .                      .
    .                       .                      .
    .                       .                      .
Parameter L             Parameter M            Parameter L
```

FIG. 15

DELTA SIGNALING OF CELL CONFIGURATION FOR INTER-CELL MOBILITY

TECHNICAL FIELD

The present disclosure relates generally to communication systems, and more particularly, to a wireless communication involving inter-cell mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a configuration for a set of cells associated with a mobility of the UE, where the configuration for the set of cells is received from a network entity, where the set of cells includes a special cell (SpCell) and a secondary cell (SCell), where the set of cells includes a first subset of activated cells and a second subset of deactivated cells, where at least one first cell of the set of cells is a reference cell and one or more second cells of the set of cells are associated with the reference cell. The apparatus receives an indication of an updated configuration for the set of cells based on a movement of the UE, where the indication of the updated configuration is received from the network entity, where the updated configuration includes at least one new cell in the set of cells.

In an aspect of the disclosure, a method, a computer-readable medium, and an apparatus are provided. The apparatus transmits a configuration for a set of cells associated with a mobility of a user equipment (UE), where the configuration for the set of cells is transmitted to the UE, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell. The apparatus configures an updated configuration for the set of cells based on a movement of the UE, where the updated configuration includes at least one new cell in the set of cells. The apparatus transmits an indication of the updated configuration for the set of cells based on the movement of the UE, where the indication of the updated configuration is transmitted to the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a diagram illustrating an example delta configuration with respect to information element (IE) of L1/L2 mobility configuration in accordance with various aspects of the present disclosure.

FIG. 11 is a diagram illustrating an example delta configuration that includes multiple delta configuration cell groups in accordance with various aspects of the present disclosure.

FIG. 12 is a diagram illustrating an example delta configuration where cells associated with a reference cell in a delta configuration cell group are specified in a cell group configuration in accordance with various aspects of the present disclosure.

FIG. 13 is a diagram illustrating an example delta configuration that includes cells associated with a reference cell and cells not associated with a reference cell in accordance with various aspects of the present disclosure.

FIG. 14 is a diagram illustrating an example delta configuration with respect to IE of L1/L2 mobility configuration that includes cells associated with a reference cell and cells not associated with a reference cell in accordance with various aspects of the present disclosure.

FIG. 15 is a diagram illustrating an example delta configuration that includes cell groups associated with reference cells and a cell group not associated with a reference cell in accordance with various aspects of the present disclosure.

DETAILED DESCRIPTION

Figure 1:
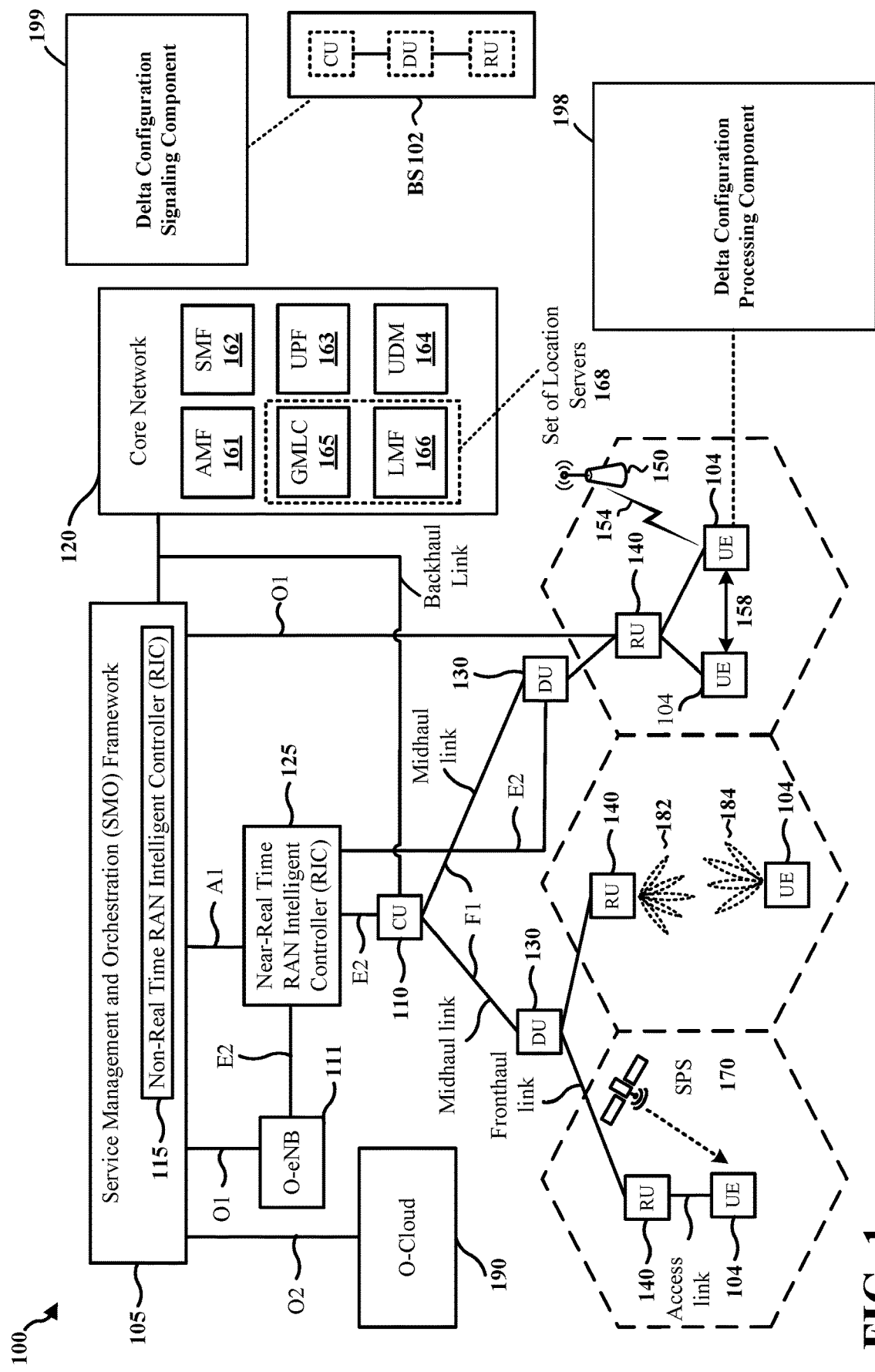
FIG. 1 is a diagram illustrating an example of a wireless communications system and an access network.

Aspects presented herein may improve the latency and efficiency of L1/L2 inter-cell mobility. In one aspect, to facilitate fast and efficient cell management using L1/L2 signaling, aspects presented herein may enable cells in the L1/L2 mobility configured cell set to include both valid SCell and SpCell configurations. As such, when a base station updates a cell to become an SpCell or an SCell for a UE, the UE may have the right configuration to apply. In another aspect, for L1/L2 mobility cell within carrier aggregation framework, as a large number of cells may be present in the L1/L2 mobility configured cell set, aspects presented herein provide procedures and signaling that enable efficient cell configuration for L1/L2 mobility. For example, delta signaling may be used for L1/L2 mobility specific configuration and/or for general cell configuration, which may be different from the delta configuration that applies to PCell during L3 handover.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to receive a configuration for a set of cells associated with a mobility of the UE, where the configuration for the set of cells is received from a network entity, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell; and receive an indication of an updated configuration for the set of cells based on a movement of the UE, where the indication of the updated configuration is received from the network entity, where the updated configuration includes at least one new cell in the set of cells (e.g., via the delta configuration process component 198). In certain aspects, the base station 102 may be configured to transmit a configuration for a set of cells associated with a mobility of a UE, where the configuration for the set of cells is transmitted to the UE, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell; configure an updated configuration for the set of cells based on a movement of the UE, where the updated configuration includes at least one new cell in the set of cells; and transmit an indication of the updated configuration for the set of cells based on the movement of the UE, where the indication of the updated configuration is transmitted to the UE (e.g., via the delta configuration signaling component 199).

Figure 2:
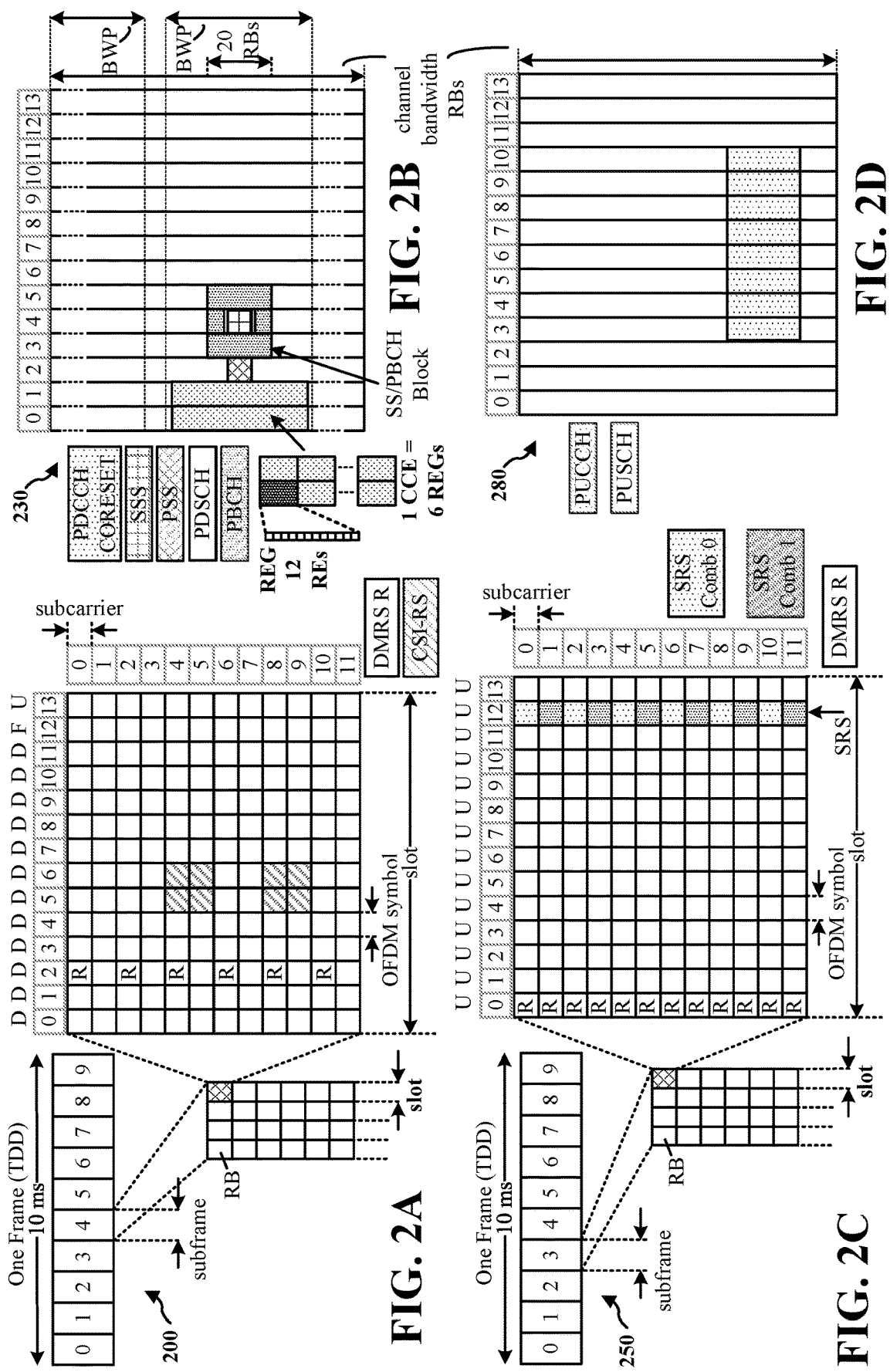
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu$*kHz, where μ is the numerology 0 to 4. As such, the numerology μ=0 has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
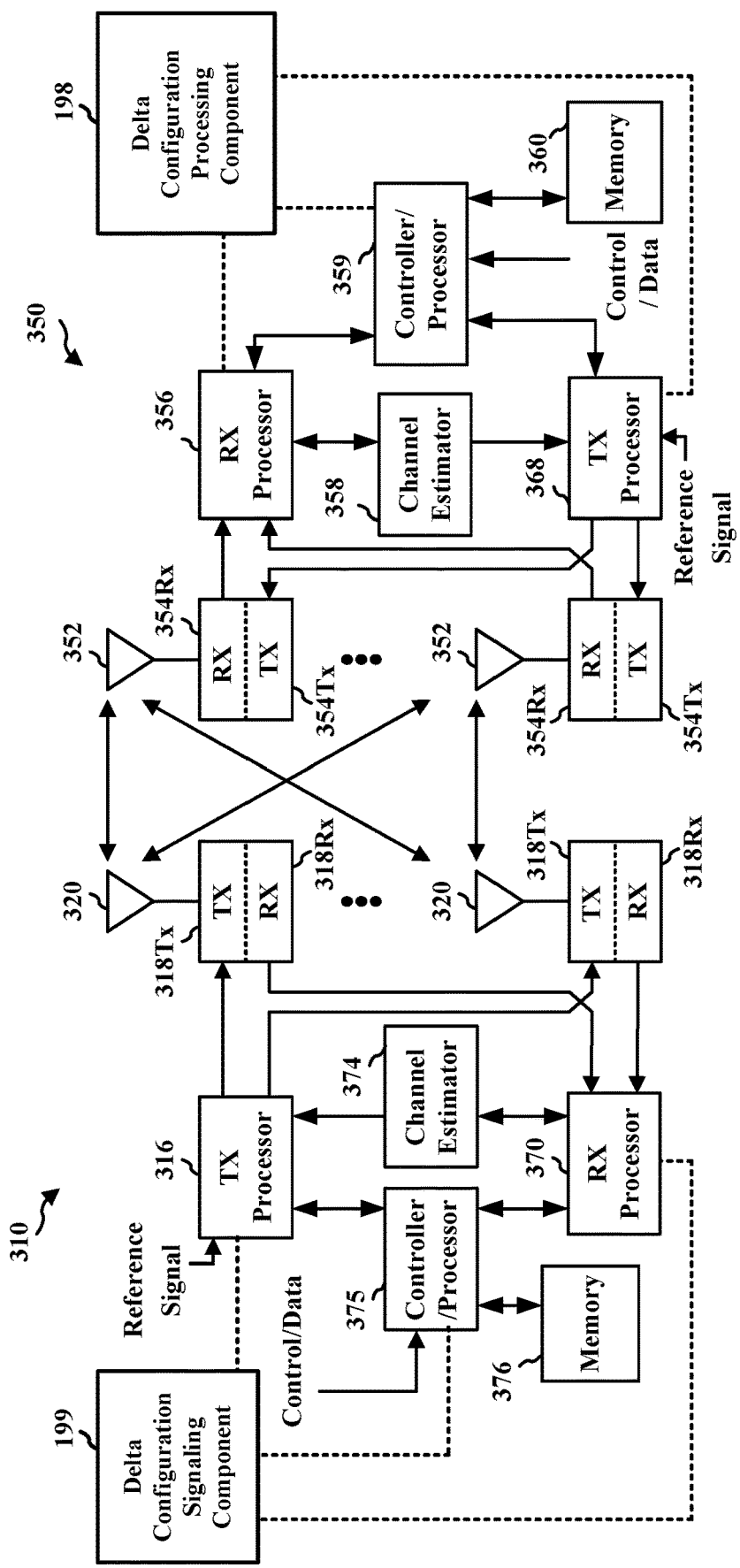
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the delta configuration process component 198 of FIG. 1.

At least one of the TX processor 316, the RX processor 370, and the controller/processor 375 may be configured to perform aspects in connection with the delta configuration signaling component 199 of FIG. 1.

Figure 4:
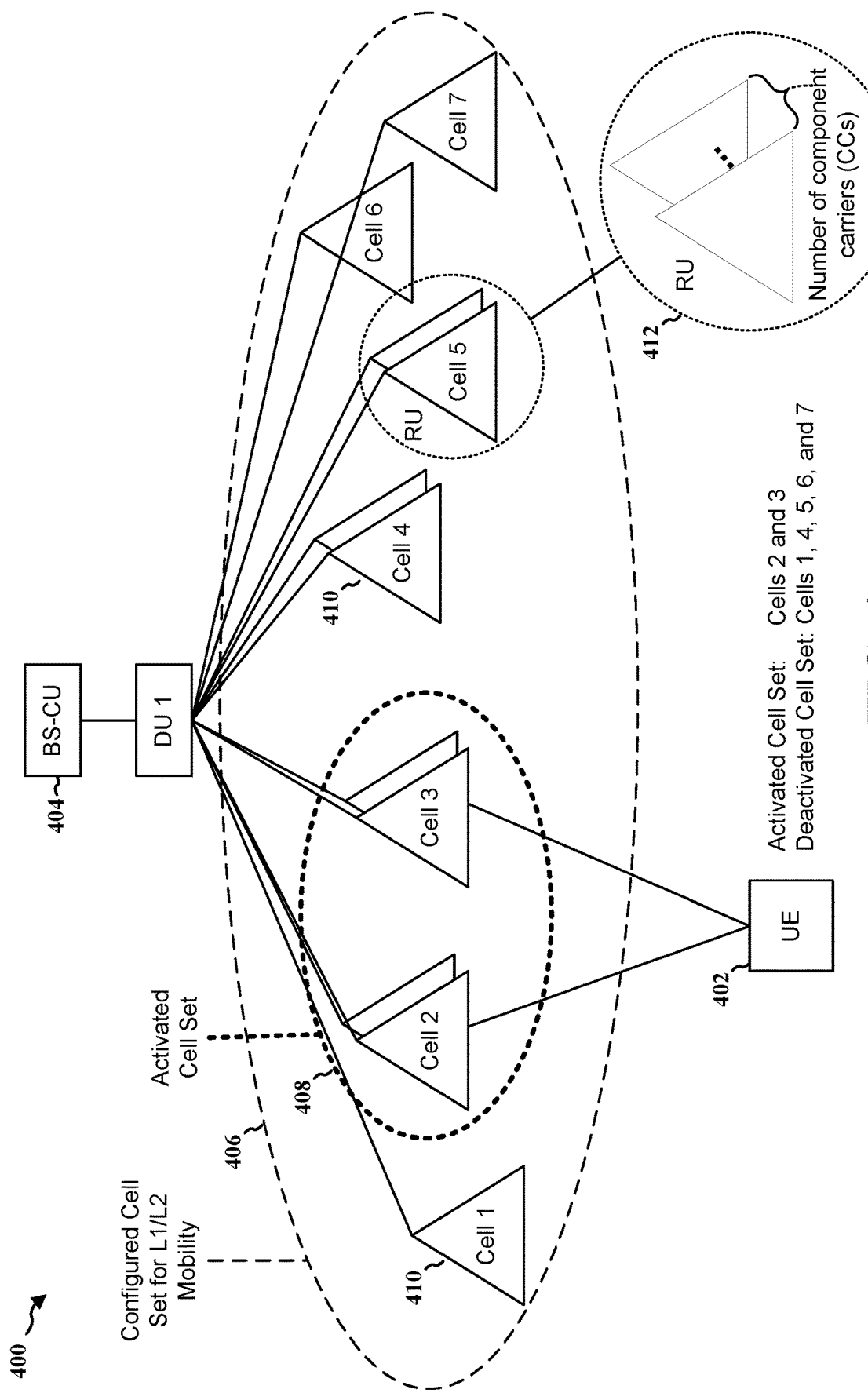
FIG. 4 is a diagram illustrating an example inter-cell mobility of a UE in accordance with various aspects of the present disclosure.

FIG. 4 is a diagram 400 illustrating an example inter-cell mobility of a UE in accordance with various aspects of the present disclosure. When a UE 402 moves from one location to another location, the UE 402 may be configured to perform layer one (L1) (e.g., physical layer) and/or layer two (L2) (e.g., medium access control (MAC) layer) based inter-cell mobility (which may also be referred to as "L1/L2 mobility" hereafter). Under inter-cell mobility, the UE 402 may be connected to a serving base station 404 (e.g., via a DU of the base station 404), but being handed over from one cell (or one group of cell) to another cell (or another group of cell) without implementing a radio resource control (RRC) anchor change (e.g., remain connected to the base station 404).

As shown at 406, for the UE 402 to perform the L1/L2 mobility, the base station 404 may configure the UE 402 with a set of cells (e.g., cells 1 to 7) via RRC configuration, which may be referred to as the L1/L2 mobility configured cell set (or simply configured cell set). Each cell with a configured cell set may be referred to as a configured cell. The L1/L2 mobility configured cell set may further include L1/L2 mobility activated cell set (or simply activated cell set) and L1/L2 mobility deactivated cell set (or simply deactivated cell set). As shown at 408, the activated cell set may refer to a group of cells (e.g., activated cells such as cells 2 and 4) in the configured cell set that are activated and can be readily used between the UE 402 and the base station 404 for data and control transfer. On the other hand, as shown at 410, the deactivated cell set may refer to a group of cells (e.g., deactivated cells) in the configured cell set that are deactivated and can be readily activated (e.g., to become part of the active cell set) by L1/L2 signaling (but may not be readily used for data and control transfer until activated). Cells in both the activated cell set and the deactivated cell set may be considered as serving cells under the L1/L2 mobility, and each cell may include multiple component carriers (CCs). The cells in the configured cell sets may belong to the same DU or different DUs. The base station 404 may continue to proactively configure the UE 402 with new set of cells based on the UE 402's mobility via RRC signaling (e.g., by adding cell(s) to and/or removing cell(s) from the configured list of cells).

To facilitate seamless mobility within the cells in the activated cell set (which may be referred to as activated cells), L1/L2 signaling may be used between the UE 402 and the base station 404 to activate/deactivate cells in the configured cell set and to select beams within the activated cells. In other words, the mobility management of the activated cells sets and the deactivated cell sets may be based on L1/L2 signaling instead of layer three (L3) (e.g., network layer, RRC) signaling as L1/L2 signaling generally takes less time compared to the L3 signaling. As such, as the UE 402 moves, the cells from the configured cell set may be deactivated and activated via L1/L2 signaling. For example, as shown by the diagram 500 of FIG. 5, after the UE 402 moves to another location, cell 4 may be activated and cell 2 may be deactivated via L1/L2 signaling between the UE 402 and the base station 404.

In some example, the inter-cell mobility may be based on the signal quality (e.g., measurements such as RSRP, SINR) and/or based on the loading of the cells. In some configurations, cells in the L1/L2 mobility configured cell set may belong to the same DU, which may be similar to carrier aggregation (CA) but the cells may be on the same carrier frequencies. In most implementations, the configured cell set configured for the UE 402 is large enough to cover a meaningful mobility area.

The UE 402 may be provided with a subset of deactivated cells (which may be referred to as a candidate cell set) in which the UE 402 may autonomously choose to add to the activated cell set, such as based on measured channel quality, the loading information, etc. For example, as shown by the diagram 400 of FIG. 4, the UE 402 may be provided with a deactivated cell set that includes deactivated cells 1, 4, 5, 6, and 7. Then, as shown by the diagram 500 of FIG. 5, as the UE 402 moves, the UE 402 may measure that the channel quality for the activated cell 2 has dropped below a threshold or has a high traffic load. In response, the UE 402 may autonomously add the deactivated cell 4 to the activated cell set. In some examples, this may be similar to conditional handover for fast and efficient addition of the prepared cells.

Referring back to FIG. 4, as shown at 412, each of the RUs (e.g., the RUs 140 described in connection with FIG. 1) that is connected to the DU of the base station 404 may have multi-carrier (e.g., N CCs) support, where each CC is a cell. As such, activation/deactivation of cells may be done based on groups of carriers (e.g., cells).

To manage the PCell, L1/L2 signaling may also be used by the UE 402 and the base station 404 to set a PCell out of one or more preconfigured options within the activated cell set. For some network, L3 mobility (e.g., L3 signaling) may be used for PCell change (e.g., L3 handover) when a new PCell is not from the activated cell set for L1/L2 mobility, where RRC signaling may be used for updating the set of cells for L1/L2 mobility at L3 handover.

Aspects presented herein may improve the latency and efficiency of L1/L2 inter-cell mobility. In one aspect, to facilitate fast and efficient cell management using L1/L2 signaling, aspects presented herein may enable cells in the L1/L2 mobility configured cell set to include both valid SCell and SpCell configurations. As such, when a base station updates a cell to become an SpCell or an SCell for a UE, the UE may have the right configuration to apply. In another aspect, for L1/L2 mobility cell within carrier aggregation framework, as a large number of cells may be present in the L1/L2 mobility configured cell set, aspects presented herein provide procedures and signaling that enable efficient cell configuration for L1/L2 mobility. For example, delta signaling may be used for L1/L2 mobility specific configuration and/or for general cell configuration, which may be different from the delta configuration that applies to PCell during L3 handover. For purposes of the present disclosure, an SpCell may include both PCell and primary secondary cell (PSCell) (e.g., SpCell=PCell+PSCell).

Figure 6:
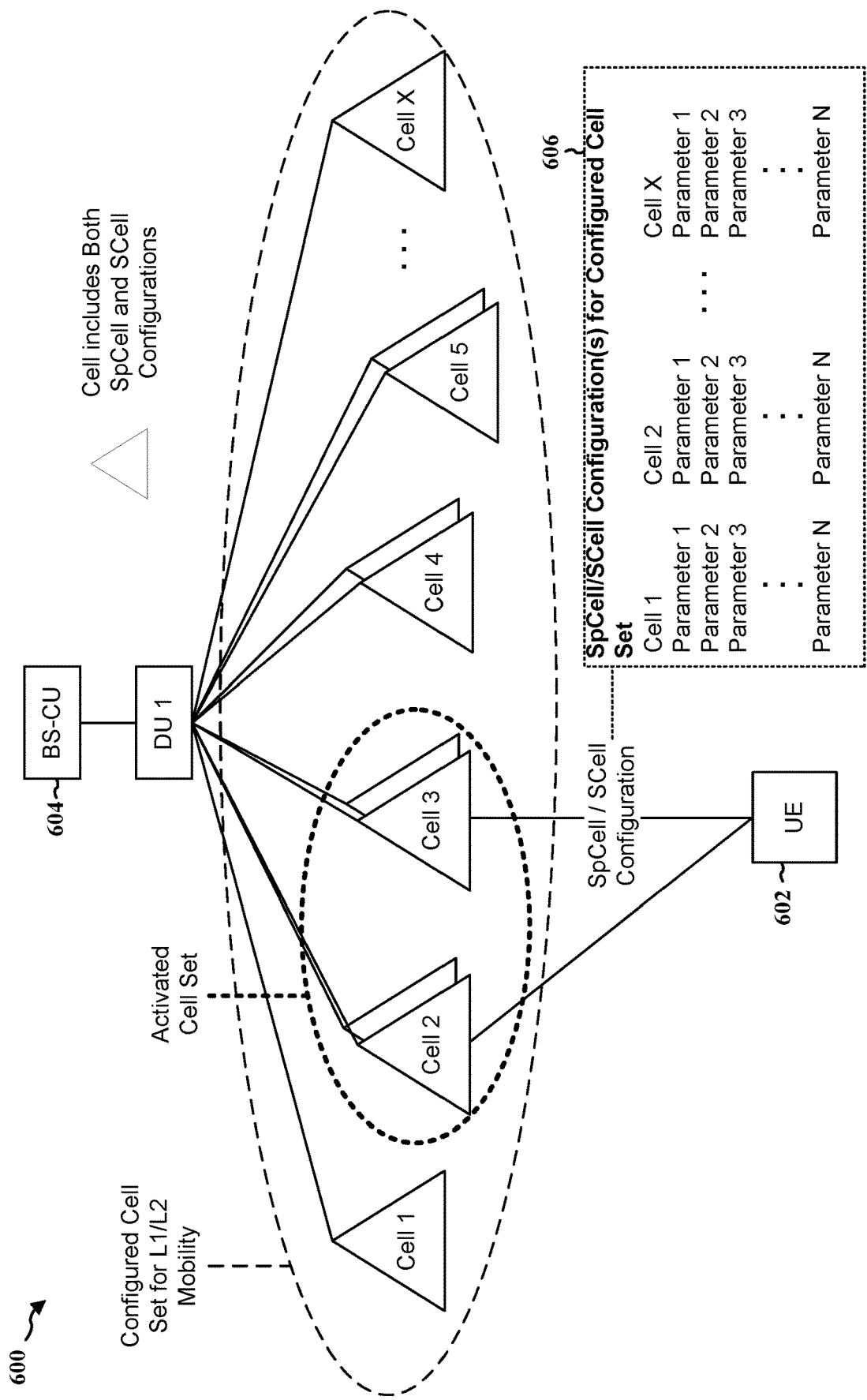
FIG. 6 is a diagram illustrating an example of cells in a configured cell set including both valid secondary cell (SCell) and special cell (SpCell) configurations in accordance with various aspects of the present disclosure.

FIG. 6 is a diagram 600 illustrating an example of cells in a configured cell set including both valid SCell and PCell configurations in accordance with various aspects of the present disclosure. In one aspect of the present disclosure, to facilitate fast and efficient cell management based on L1/L2 signaling, each cell in a configured cell set may include both SCell and SpCell configurations (or capabilities). For example, as shown at 606, when a base station 604 updates (or configures) a UE 602 with a configured cell set that includes cells 1 to X, the configuration may include both SpCell configuration and SCell configuration (SpCell/SCell configuration hereafter) for each of the cells in the configured cell set (e.g., for each of the cells 1 to X), and the SpCell/SCell configuration may include multiple configuration parameters (e.g., parameters 1 to N). Thus, when the base station 604 updates a cell to become an SpCell or an SCell for the UE 602, the UE 602 may have the corresponding configuration to apply. For example, if the base station 604 updates cell 3 to become an SpCell (e.g., via L1/L2 signaling), the UE 602 may apply SpCell configuration corresponding to cell 3 to achieve seamless inter-cell mobility.

However, when there is a large number of cells (e.g., configured cells) to be prepared/configured for operation as an SpCell (and/or SCell), the signaling overhead may be significant. For example, if there are ten (10) cells in a configured cell set and the SpCell/SCell configuration for each cell has five (5) parameters, then the signaling for the configured cell set may be specified to include at least fifty (50) parameters. As such, aspects presented herein may provide a more efficient cell configuration for L1/L2 mobility and also for general cell configuration by enabling a base station to configure a UE based on delta configuration.

Figure 7:
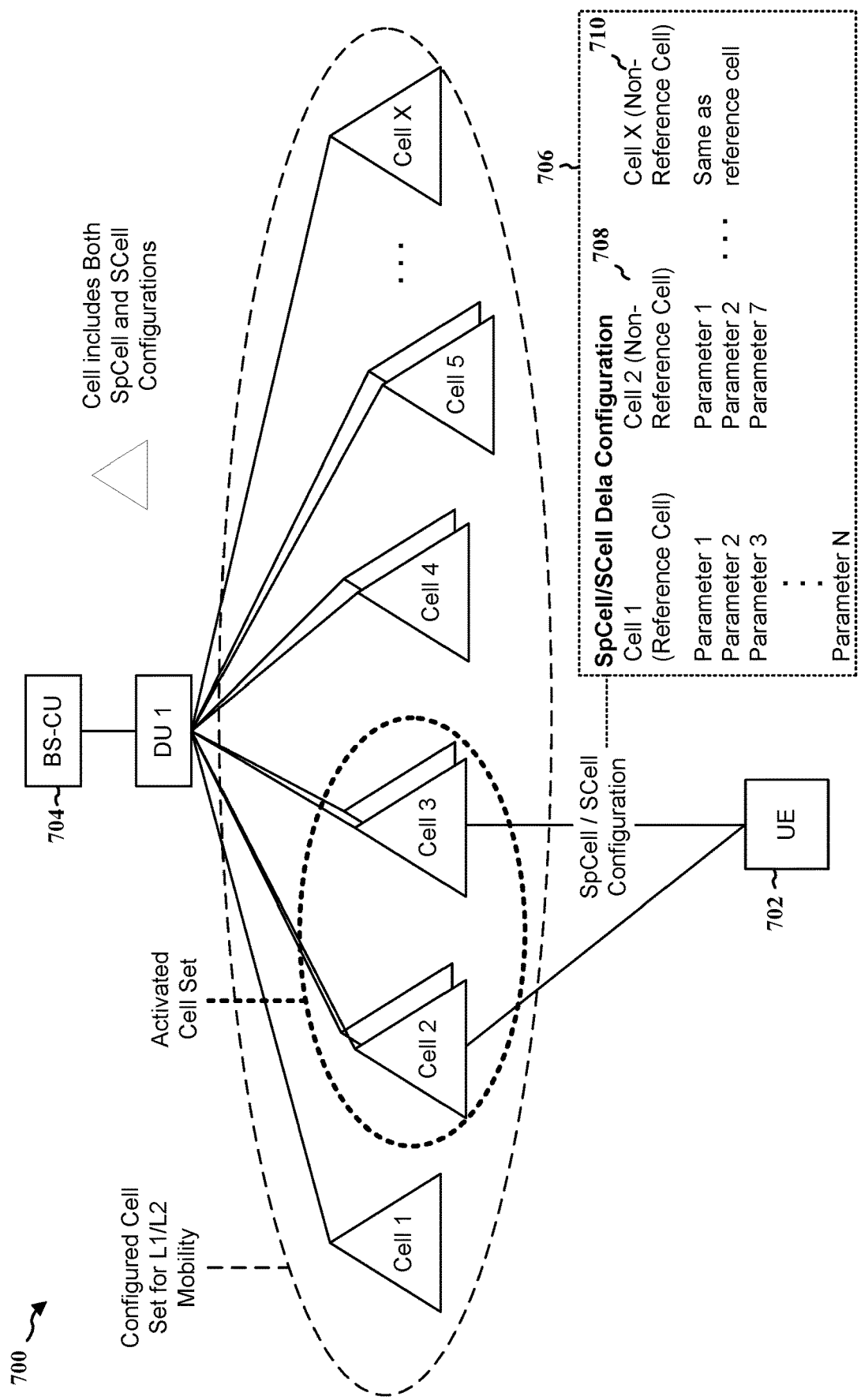
FIG. 7 is a diagram illustrating an example of configuring a cell set for layer one or layer two (L1/L2) mobility or for general cell configuration based on delta configuration in accordance with various aspects of the present disclosure.

FIG. 7 is a diagram 700 illustrating an example of configuring a cell set for L1/L2 mobility or for general cell configuration based on delta configuration (or delta signaling) in accordance with various aspects of the present disclosure. In one aspect of the present disclosure, as a group of cells (e.g., cells associated with a base station) is likely to have similar configuration, when configuring cells for L1/L2 mobility (e.g., cells within the configured cell set), a base station 704 may provide a configuration for a cell or for a group of cells to a UE 702 as a delta configuration with respect to a reference cell configuration or a cell group configuration. The reference cell may be an SpCell or an SCell, and the reference cell may be specified via the signaling.

In one example, as shown at 706, a delta configuration for L1/L2 mobility configuration or for general cell configuration may designate one cell (e.g., cell 1) as a reference cell, the delta configuration may include a plurality of configuration parameters (e.g., full configuration parameters 1 to N) for the reference cell. For other cells that are not the reference cell (which may be referred to as "non-reference cells" hereafter), their configuration parameters may be provided as delta configuration parameters, where just configuration parameters that are different from the reference cell are included in the delta configuration. For example, as shown at 708, a non-reference cell 2 may have a similar cell configuration as the reference cell 1 except for the configuration parameters 1, 2, and 7. As such, delta configuration for cell 2 may include just configuration parameters 1, 2, and 7, and other configuration parameters (e.g., ones that are the same as cell 1) may be excluded from the delta configuration to reduce signaling overhead. Then, for configuration parameters that are not included in the delta configuration, such as configuration parameters 3 to 6 and 8 to N for cell 2, the UE 702 may apply the corresponding configuration parameters based on the reference cell (e.g., apply configuration parameters 3 to 6 and 8 to N of cell 1 to cell 2). In another example, if a non-reference cell has the same configuration (e.g., same configuration parameters) as the reference cell, the delta configuration may include an indication that indicates the non-reference cell has the same configuration as the reference cell to further reduce the signaling overhead. For example, as shown at 710, a non-reference cell X may have the same cell configuration as the reference cell 1. Thus, delta configuration for cell X may include just an indication that indicates cell X has the same configuration or configuration parameters as cell 1 to reduce signaling overhead. As such, when the base station 704 updates a cell to become an SpCell or an SCell for the UE 702, the UE 702 may have the corresponding configuration to apply to achieve seamless inter-cell mobility.

For purposes of the present disclosure, a full configuration for a cell or a set of cell may refer to a configuration that includes all configuration parameters for configuring the cell or the set of cell, and a delta configuration for a cell or a set of cells may refer to a configuration that includes a subset of configuration parameters (e.g., of a full configuration) or an indication (e.g., for indicating one cell has same configuration as another cell) for the cell or the set of cell, such as shown at 706 of FIG. 7. For example, a delta configuration may refer to a configuration that just contains information elements (IEs) that are different from a reference cell's corresponding information elements. All other information elements that are not specified in the delta configuration may mean that they have the same parameter values as the reference cell. Configuration parameters for a cell under delta configuration may be referred to as delta configuration parameters. In some examples, a delta configuration may include at least one reference cell with all configuration parameters (e.g., cell 1 with configuration parameters 1 to N). In other examples, the reference cell(s) may be designated in a previous configuration of a cell set. For example, a previous configuration of a configured cell set for a UE may include cells 1 to 7 with cell 1 designated as the reference cell. After the UE moves, the base station may update the configured cell set to include cells 1 to 3 and 8 to 10 (e.g., by removing cells 4 to 7 and adding cells 8 to 10). In this example, the delta configuration may include delta configuration parameters for cells 8 to 10 without including the full configuration for cell 1. In addition, for purposes of the present disclosure, the delta configuration may include L1/L2 mobility specific configuration, such as SpCell configuration, PCell configuration, SCell configuration, L1 measurements and/or reporting configuration for deactivated cells, or a combination thereof. In some examples, the delta configuration may also include a general cell configuration (e.g., configuration not related to L1/L2 mobility). In some examples, one or more delta configuration parameters in the delta configuration may be an independent value (e.g., parameter 1=256, parameter 2=128, parameter 3=Yes, etc.). In other examples, one or more delta configuration parameters may be delta values with respect to the configuration parameters of the reference cell to further reduce signaling overhead (e.g., parameter 1=+4, parameter 2=−16, etc.).

FIG. 8 is a diagram 800 illustrating an example delta configuration with respect to information element (IE) of L1/L2 mobility configuration (e.g., l1L2MobilityConfig) in accordance with various aspects of the present disclosure. As shown at 802, the delta configuration may include a full configuration (e.g., SpCellConfig and SCellConfig) for a reference cell. As shown at 804, for other non-reference cells, delta configuration parameters (which may also be referred to as "partial configuration" hereafter) may be applied, which may include just a subset of parameters of the full configuration (e.g., deltaConfigForspCell and deltaConfigForsCell), such as described in connection with FIG. 7.

Figure 9:
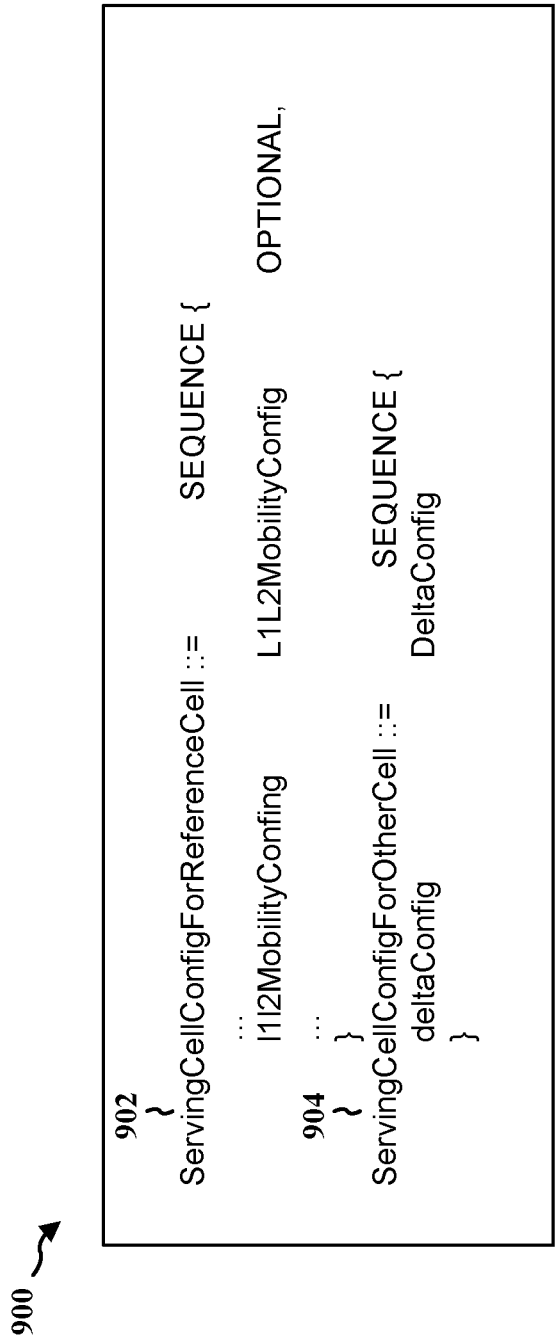
FIG. 9 is a diagram illustrating an example delta configuration with respect to IE of a serving cell configuration in accordance with various aspects of the present disclosure.

FIG. 9 is a diagram 900 illustrating an example delta configuration with respect to IE of a serving cell configuration (e.g., ServingCellConfig) in accordance with various aspects of the present disclosure. As shown at 902, the delta configuration may include a full configuration (e.g., ServingCellConfigForReferenceCell and l1l2MobilityConfing) for the reference cell(s). As shown at 904, for other non-reference cells, delta configuration/delta configuration parameters may be applied, which may include just a subset of parameters of the full configuration (e.g., ServingCellConfigForOtherCell and deltaConfig), such as described in connection with FIG. 7. In some examples, serving cell configuration for the reference cell (e.g., ServingCellConfigForReferenceCell) and serving cell configuration for other cell (e.g., ServingCellConfigForOtherCell) may also be presented in a cell group configuration (e.g., cellGroupConfig) IE to configure the reference cell and other non-reference cells, respectively.

In one aspect of the present disclosure, as described in connection with 606 of FIG. 6, one cell (e.g., cell 1) in a configured cell set may be assigned/designated as the reference cell, and the rest of the cells in the configured cell set may be configured with partial configuration/delta configuration parameters with respect to the reference cell. In other words, there may be just one reference cell in a configured cell set.

Figure 10:
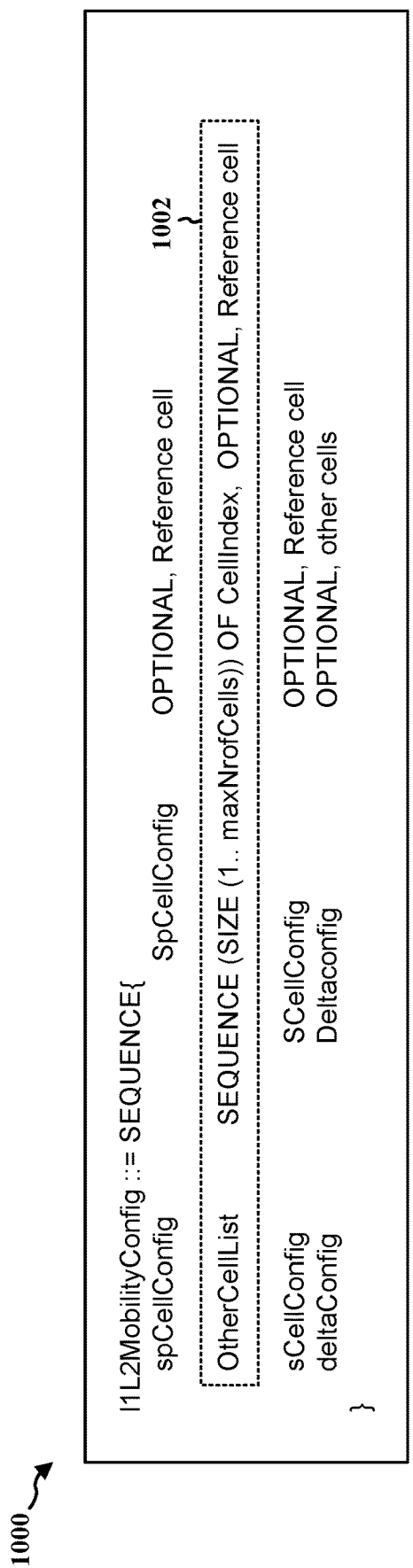
FIG. 10 is a diagram illustrating an example delta configuration with respect to IE of L1/L2 mobility configuration that includes one reference cell in accordance with various aspects of the present disclosure.

FIG. 10 is a diagram 1000 illustrating an example delta configuration with respect to IE of L1/L2 mobility configuration (e.g., l1L2MobilityConfig) that includes one reference cell in accordance with various aspects of the present disclosure. As described in connection with FIG. 8, a delta configuration may include a full configuration (e.g., SpCellConfig and SCellConfig) for a reference cell and partial configuration for a non-reference cell. As shown at 1002, the delta configuration may further include an IE (e.g., OtherCellList) that specifies the list of other non-reference cells (e.g., identified by their corresponding cell IDs) that will take the reference cell as the reference cell.

In another aspect of the present disclosure, more than one cell in a configured cell set may be assigned/designated as the reference cell, and each of the reference cell may be associated with a corresponding cell group that includes a number of non-reference cells (which may be referred to as a "delta configuration cell group" hereafter). Similarly, for each delta configuration cell group, the reference cell may be configured with a full configuration while other non-reference cells may be configured with partial configuration/delta configuration parameters with respect to the reference cell.

FIG. 11 is a diagram 1100 illustrating an example delta configuration that includes multiple delta configuration cell groups in accordance with various aspects of the present disclosure. In one example, a delta configuration may include three delta configuration cell groups: cell group 1, cell group 2, and cell group 3. As shown at 1102, cell group 1 may include cells 1, 2, and 3, where cell 1 is designated as the reference cell and cells 2 and 3 are non-reference cells. The delta configuration may include a full configuration for cell 1, and cells 2 and 3 may be configured with partial configuration/delta configuration parameters with respect to cell 1, such as described in connection with FIG. 7. Similarly, as shown at 1104, cell group 2 may include cells 4, 5, and 6, where cell 4 is designated as the reference cell and cells 5 and 6 are non-reference cells. The delta configuration may include a full configuration for cell 4, and cells 5 and 6 may be configured with partial configuration/delta configuration parameters with respect to cell 4. In one example, if a non-reference cell (e.g., cell 5) has the same configuration (e.g., same configuration parameters) as the reference cell (e.g., cell 4), the delta configuration may indicate that the non-reference cell (e.g., cell 5) has the same configuration as the reference cell (e.g., cell 4) to further reduce signaling overhead. Similarly, as shown at 1106, cell group 3 may include cells 7 to X, where cell 7 is designated as the reference cell and cells 8 to X are non-reference cells. The delta configuration may include a full configuration for cell 7, and cells 8 to X may be configured with partial configuration/delta configuration parameters with respect to cell 7. As such, more than one cell (e.g., cells 1, 4, and 7) may be configured with a full configuration under such scenario. Configuration for each reference cell may also be different from each other. For example, configuration for reference cell 1 may include configuration parameters 1 to N, configuration for reference cell 2 may include configuration parameters 1 to Y, and configuration for reference cell 7 may also include configuration parameters 1 to N but with values different than cell 1, etc.

FIG. 12 is a diagram 1200 illustrating an example delta configuration where cells associated with a reference cell in a delta configuration cell group are specified in a cell group configuration (e.g., CellGroupConfig) in accordance with various aspects of the present disclosure. In some example, such configuration may apply to both delta configurations with regard to the L1/L2 mobility configuration (e.g., l1L2MobilityConfig) IE and/or the general serving cell configuration (e.g., ServingCellConfig) IE.

In another aspect of the present disclosure, in addition to designating at least one cell in a configured cell set as the reference cell(s) and associating each reference cell with one or more non-reference cells, such as described in connection with FIGS. 7 to 12, at least one other cell in the configured cell set may be provided with a full configuration. In other words, some of the cells in the configured cell set may not be associated with a reference cell, and the delta configuration may include a full configuration for each of these cells.

FIG. 13 is a diagram 1300 illustrating an example delta configuration that includes cells associated with a reference cell (or partial configuration) and cells not associated with a reference cell (or partial configuration) in accordance with various aspects of the present disclosure. In one example, a configured cell set may include ten (10) cells (e.g., cells 1 to 10), where cell 1 may be designated as the reference cell, and cells 2 to 7 are non-reference cells that are associated with cell 1 for delta configuration, such as shown at 1302. For example, cell 1 may be configured with a full configuration and cells 2 to 7 may be configured with partial configuration/delta configuration parameters with respect to cell 1. In addition, as shown at 1304, as cells 8 to 10 are not associated with the reference cell 1, the delta configuration may include a full configuration for each of the cells 8 to 10.

FIG. 14 is a diagram 1400 illustrating an example delta configuration with respect to IE of L1/L2 mobility configuration (e.g., l1L2MobilityConfig) that includes cells associated with a reference cell (or partial configuration) and cells not associated with a reference cell (or partial configuration) in accordance with various aspects of the present disclosure. As shown at 1402, in one example, SpCell configuration (e.g., spCellConfig) and SCell configuration (e.g., sCellConfig) IEs may be provided to reference cell(s) as well as other cells that are not delta configured. In addition, different SpCell configurations and/or SCell configurations may be provided for different cells (e.g., for cells that are not associated with the reference cell).

FIG. 15 is a diagram 1500 illustrating an example delta configuration that includes cell groups associated with reference cells (or partial configurations) and a cell group not associated with a reference cell (or partial configuration) in accordance with various aspects of the present disclosure. In another example, as described in connection with FIG. 11, a delta configuration may include multiple delta configuration cell groups, such as cell group 1 and cell group 2. Cell group 1 may include cells 1, 2, and 3, where cell 1 is designated as the reference cell and cells 2 and 3 are non-reference cells. The delta configuration may include a full configuration for cell 1, and cells 2 and 3 may be configured with delta configuration/delta configuration parameters with respect to cell 1, such as described in connection with FIG. 7. Similarly, cell group 2 may include cells 4, 5, and 6, where cell 4 is designated as the reference cell and cells 5 and 6 are non-reference cells. The delta configuration may include a full configuration for cell 4, and cells 5 and 6 may be configured with delta configuration/delta configuration parameters with respect to cell 4. In addition to delta configuration cell groups that include reference cells (e.g., cell groups 1 and 2), another cell group may be included in the delta configuration that includes cells that are not associated with a reference cell (which may be referred to as a "non-delta configuration cell group" hereafter). For example, as shown at 1502, a non-delta configuration cell group (e.g., cell group 3) may include cells 7 to X that are not associated with a reference cell. As such, the delta configuration may include a full configuration for each of the cells in the cell group 3. Similarly, different configuration parameters may be applied to different cells in the cell group 3.

Figure 16:
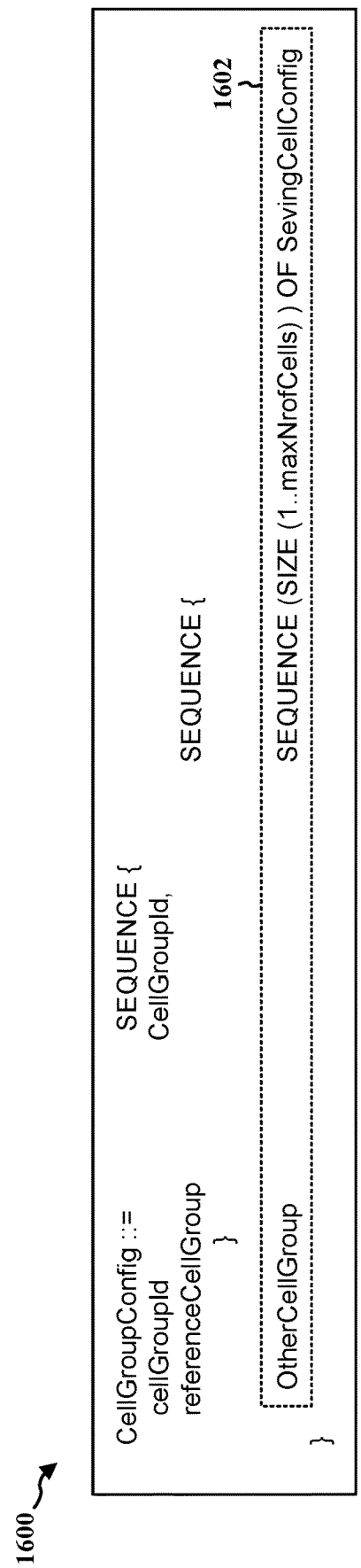
FIG. 16 is a diagram illustrating an example delta configuration with respect to IE of cell group configuration that includes cell groups associated with reference cells and a cell group not associated with a reference cell in accordance with various aspects of the present disclosure.

FIG. 16 is a diagram 1600 illustrating an example delta configuration with respect to IE of a cell group configuration (e.g., CellGroupConfig) that includes cell groups associated with reference cells (or partial configuration) and a cell group not associated with a reference cell (or partial configuration) in accordance with various aspects of the present disclosure. As shown at 1602, In one example, cells specified in other cell group (e.g., OtherCellGroup) IE (e.g., non-delta configuration cell group) may be configured with full configuration, and difference configurations may be provided to those cells as compared to the reference cells.

Figure 17:
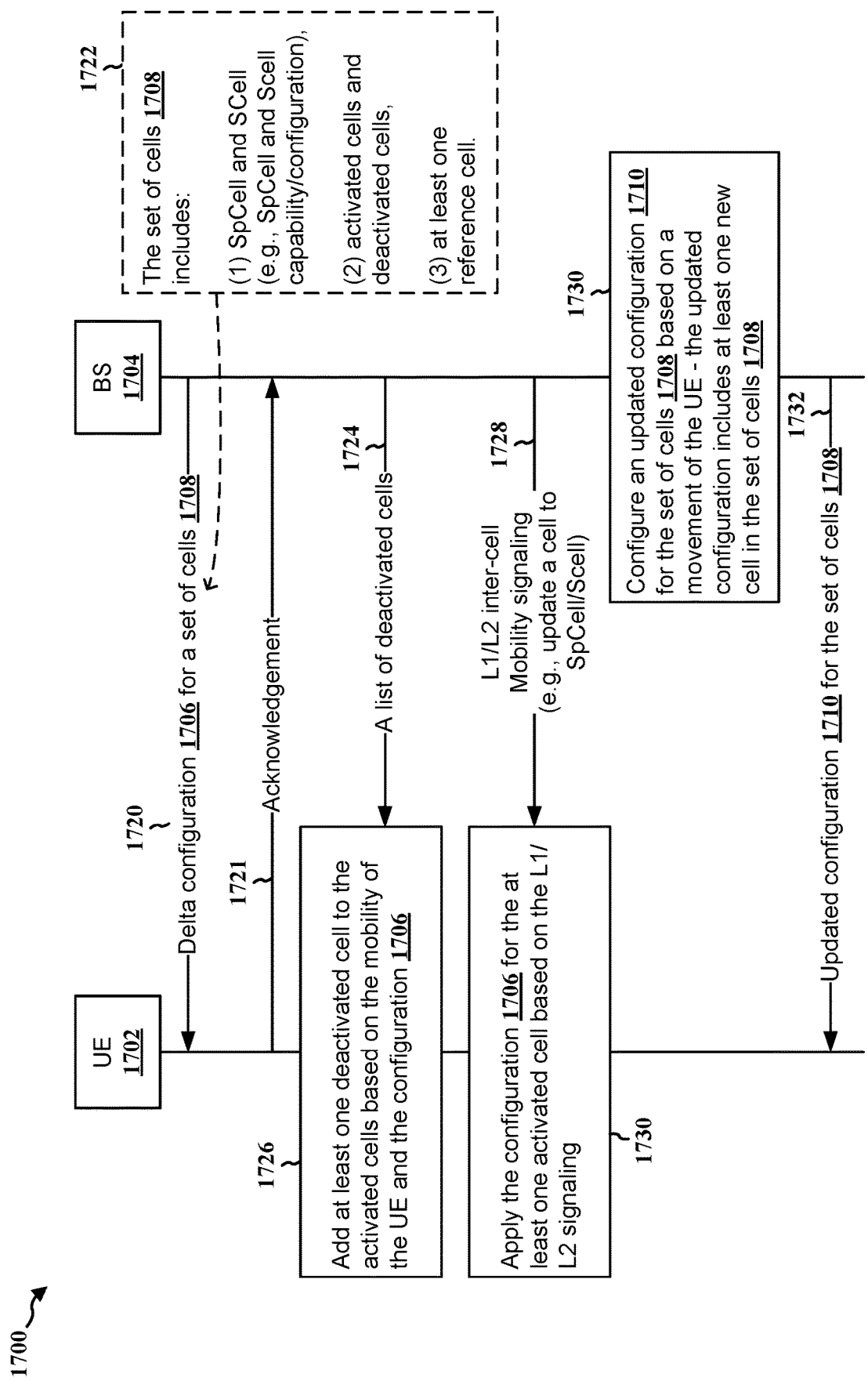
FIG. 17 is a communication flow illustrating an example of delta configuration and signaling for L1/L2 inter-cell mobility in accordance with aspects of the present disclosure.

FIG. 17 is a communication flow 1700 illustrating an example of delta configuration and signaling for L1/L2 inter-cell mobility in accordance with aspects of the present disclosure. The numberings associated with the communication flow 1700 do not specify a particular temporal order and are merely used as references for the communication flow 1700. Aspects presented herein may enable a base station to use delta configuration for providing L1/L2 mobility specific configuration and/or for general cell configuration, which may improve configuration for UE mobility by reducing signaling overhead.

At 1720, a base station 1704 may transmit a delta configuration 1706 to a UE 1702 for a set of cells 1708, such as described in connection with FIG. 7. As shown at 1722, each cell in the set of cells 1708 may include both SpCell and SCell capabilities/configurations, and the set of cells 1708 may include a set of activated cells and a set of deactivated cells, such as described in connection with FIGS. 4 and 5. In addition, as described in connection with FIGS. 7 to 16, there may be at least one reference cell in the set of cells 1708, where the delta configuration 1706 may include a full configuration for the reference cell and partial configuration/delta configuration parameters for the non-reference cells with respect to the reference cell. The delta configuration 1706 may be associated with L1/L2 mobility of the UE 1702 and/or general cell configuration. The reference cell may be an SpCell or an SCell. The base station 1704 may transmit the delta configuration 1706 to the UE 1702 via RRC signaling.

In one example, the delta configuration 1706 may include a set of parameters such as a cell index, an SSB measurement timing, a cell group ID, or a combination thereof.

In another example, there may be multiple reference cells, where each reference cell is associated with a group of non-reference cells, such as described in connection with FIGS. 11 and 12. In such an example, the delta configuration 1706 may include a full configuration for each of the reference cell, and partial configuration/delta configuration parameters for their respective non-reference cells.

In another example, as described in connection with FIGS. 13 to 15, there may be additional cells in the set of cells 1708 that are not associated with a reference cell or a reference cell group. As such, the delta configuration 1706 may include a full configuration for each of these additional cells.

In another example, if a non-reference cell has the same configuration as a reference cell, the delta configuration 1706 may include an indication indicating the UE 1702 to apply the same configuration to the non-reference cell as the reference cell.

In another example, at 1721, the UE 1702 may transmit an acknowledgement message to the base station 1704 in response to the delta configuration 1706 from the base station. The acknowledgement message may indicate whether the UE 1702 receives the delta configuration 1706 and/or whether the UE 1702 is able to apply the delta configuration 1706, etc.

Figure 5:
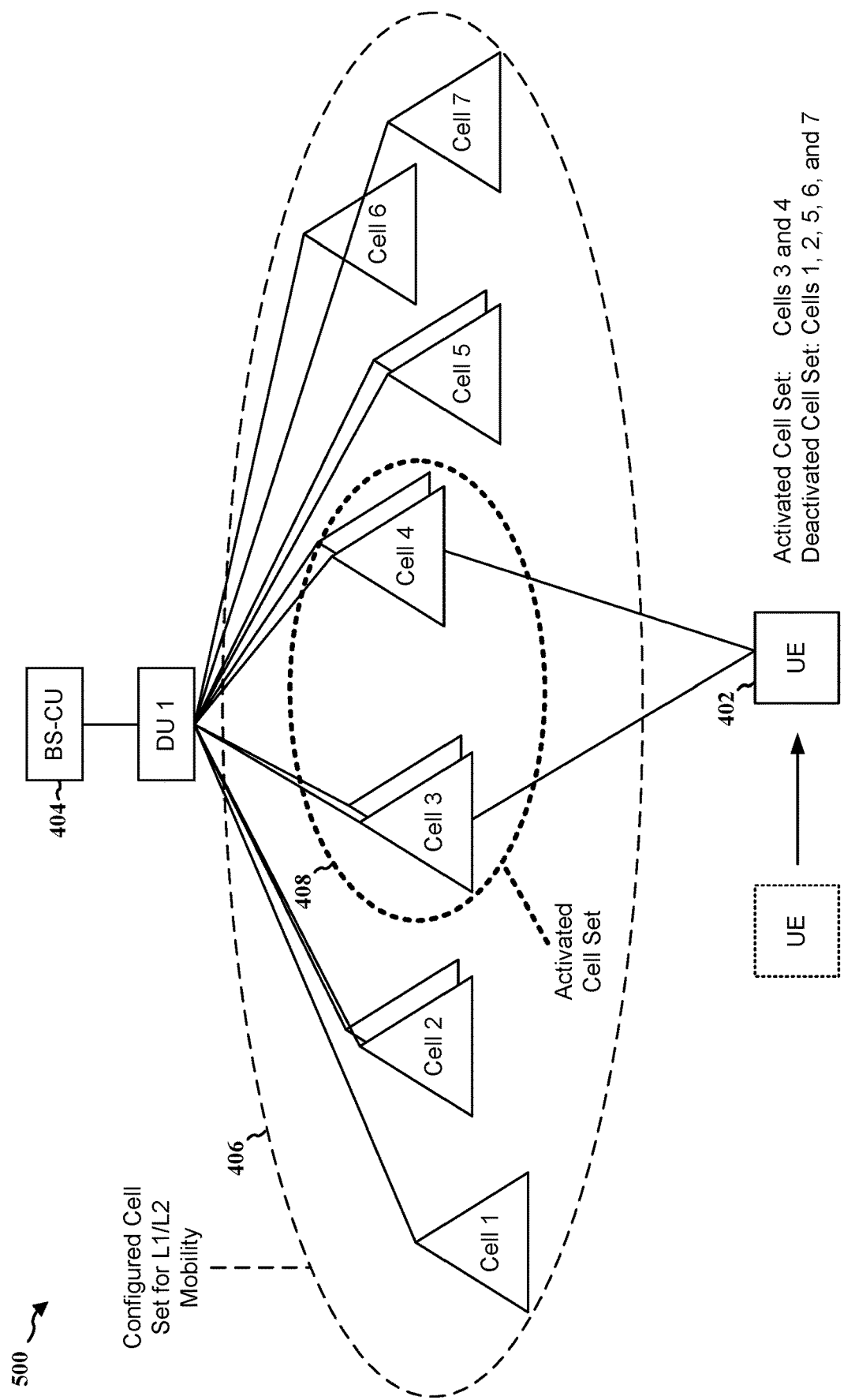
FIG. 5 is a diagram illustrating an example inter-cell mobility of a UE in accordance with various aspects of the present disclosure.

At 1724, the base station 1704 may transmit a list of deactivated cells (e.g., candidate cells) to the UE 1702. In response, at 1726, the UE 1702 may add at least one deactivated cell to the activated cells based on the mobility of the UE and the configuration 1706 (e.g., the UE 1702 may apply the corresponding configuration for the newly added activated cell(s)). For example, as shown by FIGS. 4 and 5, the base station 404 may configure the UE 402 with a cell set for L1/L2 mobility. Then, the UE 402 may add or remove cell(s) from the cell set based on the mobility of the UE 402. For example, when the UE 402 moves from one location to another location, the UE 402 may add the deactivated cell 4 to the activated cell set, and remove the activated cell 2 to the deactivated cell set.

At 1728, the base station 1704 may transmit an L1/L2 signaling to the UE 1702 to update at least one activated cell in the set of cells 1708 to an SpCell or an SCell. In response, at 1730, the UE 1702 may apply the delta configuration 1706 for that at least one activated cell.

At 1730, the base station 1704 may configure an updated configuration 1710 for the set of cells 1708 based on a movement (or mobility) of the UE 1702 and/or based on the loading associated with the cells in the set of cells 1708, where one or more cells may be added and/or removed from the set of cells 1708. At 1732, the base station 1704 may transmit the updated configuration 1710 for the set of cells 1708 to the UE 1702, such as described in connection with FIGS. 4 and 5. For example, when the UE 1702 moves from one location to another location, the base station 1704 may determine that some cells within the set of cells 1708 are no longer within the communication range of the UE 1702 and/or there are new cells that are closer to the UE 1702. As such, the base station 1704 may configure an update for the set of cells 1708 accordingly. In another example, if the base station 1704 determines that some cells within the set of cells 1708 are having loads/traffics higher than a threshold (e.g., number of UEs connecting to a cell exceeds a threshold), the base station 1704 may remove these cells from the set of cells 1708 and/or add additional cells to the set of cells 1708 that have lighter loads (compared to the ones having heavier loads).

Figure 18:
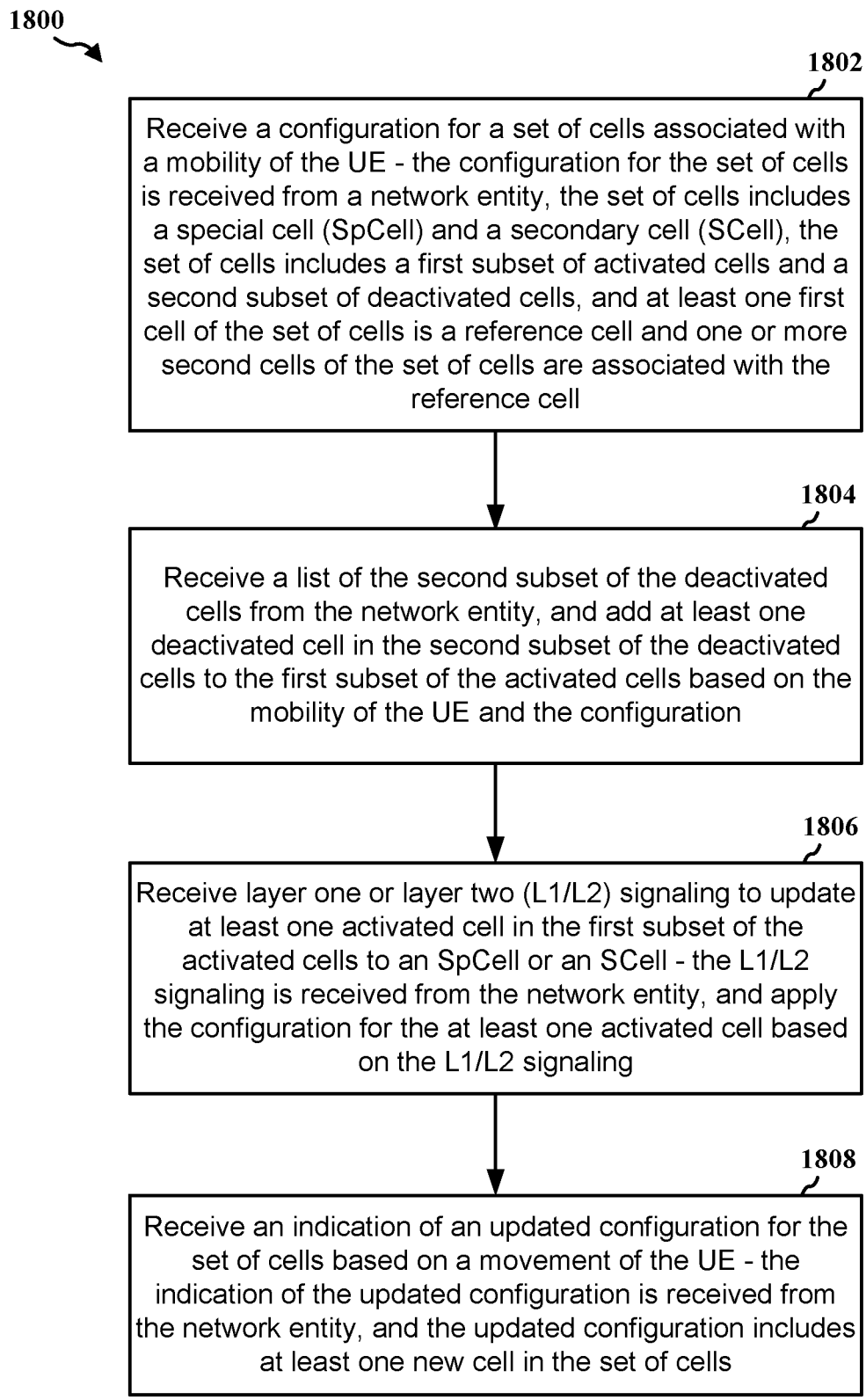
FIG. 18 is a flowchart of a method of wireless communication.

FIG. 18 is a flowchart 1800 of a method of wireless communication. The method may be performed by a UE (e.g., the UE 104, 402, 602, 702, 1702; the apparatus 2004). The method may enable the UE to apply delta configuration for one or more cells and perform handover between cells based on L1/L2 signaling.

At 1802, the UE may receive a configuration for a set of cells associated with a mobility of the UE, where the configuration for the set of cells is received from a network entity, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell, such as described in connection with FIGS. 7 to 17. For example, at 1720 of FIG. 17, the UE 1702 may receive a delta configuration 1706 for a set of cells 1708 from the base station 1704 that is associated with a mobility of the UE 1702, where the set of cells 1708 includes SpCell and SCell (e.g., SpCell and SCell capability/configuration), activated cells and deactivated cells, and at least one reference cell. The reception of the configuration may be performed by, e.g., the delta configuration process component 198, the cellular baseband processor 2024, and/or the transceiver(s) 2022 of the apparatus 2004 in FIG. 20.

In one example, the configuration includes a set of parameters including at least one of: a cell index, an SSB measurement timing, a cell group ID, or a combination thereof.

In another example, the configuration includes a set of delta configuration parameters for the one or more second cells of the set of cells with respect to the at least one first cell of the set of cells.

In another example, each of the at least one first cell of the set of cells is associated with a number of other cells in the set of cells as a group, and where the configuration includes a full configuration for the at least one first cell of the set of cells and one or more delta configurations for the number of other cells.

In another example, each of the at least one first cell of the set of cells is associated with a number of other cells in the set of cells as a group, and where the configuration includes a full configuration for the at least one first cell of the set of cells and the number of other cells.

In another example, the configuration is a delta configuration associated with an L1/L2 mobility of the UE. In such an example, the delta configuration includes a set of delta parameters including at least one of: an SpCell configuration, a L1 measurement or reporting configuration for the second subset of deactivated cells, a general cell configuration, or a combination thereof.

In another example, the reference cell is an SpCell or an SCell.

In another example, the configuration for the set of cells is received via L3 signaling or RRC signaling.

In another example, the configuration indicates that a second set of configuration parameters for the one or more second cells of the set of cells is equivalent to a first set of configuration parameters for the at least one first cell of the set of cells.

At 1804, the UE may receive a list of the second subset of the deactivated cells from the network entity, and the UE may add at least one deactivated cell in the second subset of the deactivated cells to the first subset of the activated cells based on the mobility of the UE and the configuration, such as described in connection with FIGS. 7 to 17. For example, at 1724 and 1726 of FIG. 17, the UE 1702 may receive a list of deactivated cells from the base station 1704, and the UE 1702 may add at least one deactivated cell to the activated cells based on the mobility of the UE and the configuration 1706. The reception of the list of the second subset of the deactivated cells and/or the addition of the at least one deactivated cell may be performed by, e.g., the delta configuration process component 198, the cellular baseband processor 2024, and/or the transceiver(s) 2022 of the apparatus 2004 in FIG. 20.

At 1806, the UE may receive L1/L2 signaling to update at least one activated cell in the first subset of the activated cells to an SpCell or an SCell, where the L1/L2 signaling is received from the network entity, and the UE may apply the configuration for the at least one activated cell based on the L1/L2 signaling, such as described in connection with FIGS. 7 to 17. For example, at 1728 and 1730 of FIG. 17, the UE 1702 may receive an L1/L2 inter-cell mobility signaling from the base station 1704, and the UE 1702 may apply the configuration 1706 for the at least one activated cell based on the L1/L2 signaling. The reception of the L1/L2 signaling to update at least one activated cell and/or the application of the configuration for the at least one activated cell based on the L1/L2 signaling may be performed by, e.g., the delta configuration process component 198, the cellular baseband processor 2024, and/or the transceiver(s) 2022 of the apparatus 2004 in FIG. 20.

At 1808, the UE may receive an indication of an updated configuration for the set of cells based on a movement of the UE, where the indication of the updated configuration is received from the network entity, where the updated configuration includes at least one new cell in the set of cells, such as described in connection with FIGS. 7 to 17. For example, at 1732 of FIG. 17, the UE 1702 may receive an updated configuration 1710 for the set of cells 1708, where the updated configuration includes at least one new cell in the set of cells 1708. The reception of the indication of the updated configuration may be performed by, e.g., the delta configuration process component 198, the cellular baseband processor 2024, and/or the transceiver(s) 2022 of the apparatus 2004 in FIG. 20.

Figure 19:
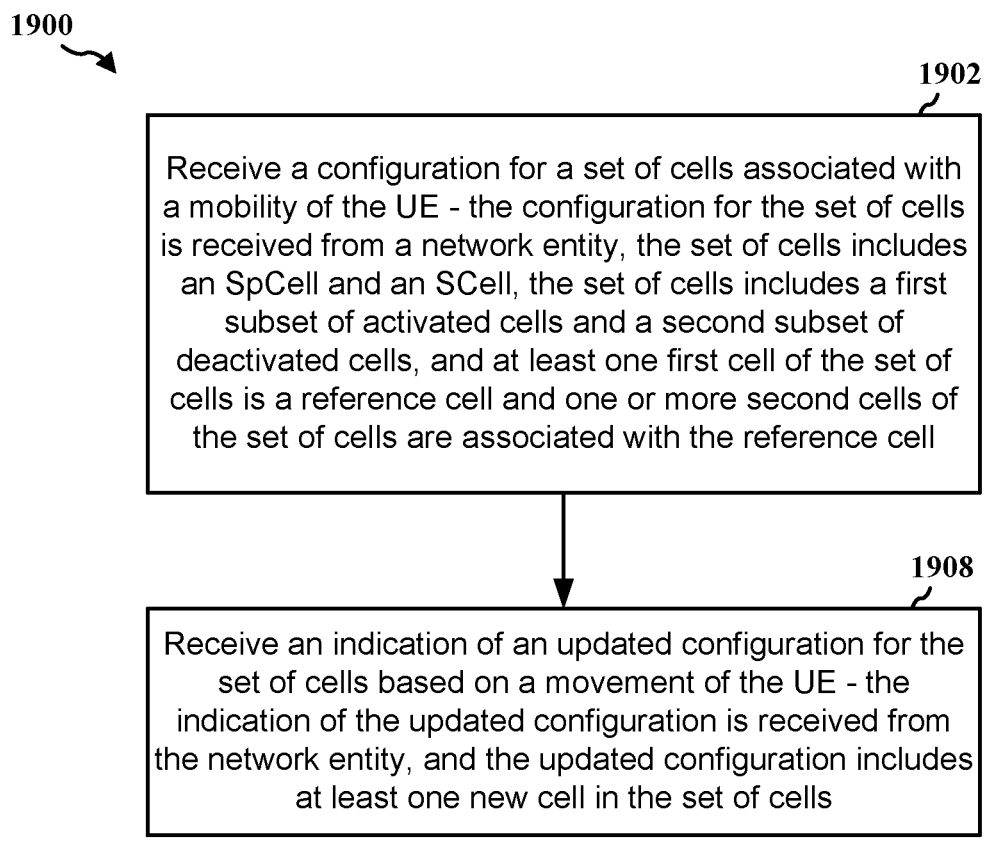
FIG. 19 is a flowchart of a method of wireless communication.

FIG. 19 is a flowchart 1900 of a method of wireless communication. The method may be performed by a UE (e.g., the UE 104, 402, 602, 702, 1702; the apparatus 2004). The method may enable the UE to apply delta configuration for one or more cells and perform handover between cells based on L1/L2 signaling.

At 1902, the UE may receive a configuration for a set of cells associated with a mobility of the UE, where the configuration for the set of cells is received from a network entity, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell, such as described in connection with FIGS. 7 to 17. For example, at 1720 of FIG. 17, the UE 1702 may receive a delta configuration 1706 for a set of cells 1708 from the base station 1704 that is associated with a mobility of the UE 1702, where the set of cells 1708 includes SpCell and SCell capability/configuration, activated cells and deactivated cells, and at least one reference cell. The reception of the configuration may be performed by, e.g., the delta configuration process component 198, the cellular baseband processor 2024, and/or the transceiver(s) 2022 of the apparatus 2004 in FIG. 20.

In one example, the configuration includes a set of parameters including at least one of: a cell index, an SSB measurement timing, a cell group ID, or a combination thereof.

In another example, the configuration includes a set of delta configuration parameters for the one or more second cells of the set of cells with respect to the at least one first cell of the set of cells.

In another example, each of the at least one first cell of the set of cells is associated with a number of other cells in the set of cells as a group, and where the configuration includes a full configuration for the at least one first cell of the set of cells and one or more delta configurations for the number of other cells.

In another example, each of the at least one first cell of the set of cells is associated with a number of other cells in the set of cells as a group, and where the configuration includes a full configuration for the at least one first cell of the set of cells and the number of other cells.

In another example, the configuration is a delta configuration associated with an L1/L2 mobility of the UE. In such an example, the delta configuration includes a set of delta parameters including at least one of: an SpCell configuration, a L1 measurement or reporting configuration for the second subset of deactivated cells, a general cell configuration, or a combination thereof.

In another example, the reference cell is an SpCell or an SCell.

In another example, the configuration for the set of cells is received via L3 signaling or RRC signaling.

In another example, the configuration indicates that a second set of configuration parameters for the one or more second cells of the set of cells is equivalent to a first set of configuration parameters for the at least one first cell of the set of cells.

In another example, the UE may receive a list of the second subset of the deactivated cells from the network entity, and the UE may add at least one deactivated cell in the second subset of the deactivated cells to the first subset of the activated cells based on the mobility of the UE and the configuration, such as described in connection with FIGS. 7 to 17. For example, at 1724 and 1726 of FIG. 17, the UE 1702 may receive a list of deactivated cells from the base station 1704, and the UE 1702 may add at least one deactivated cell to the activated cells based on the mobility of the UE and the configuration 1706. The reception of the list of the second subset of the deactivated cells and/or the addition of the at least one deactivated cell may be performed by, e.g., the delta configuration process component 198, the cellular baseband processor 2024, and/or the transceiver(s) 2022 of the apparatus 2004 in FIG. 20.

In another example, the UE may receive L1/L2 signaling to update at least one activated cell in the first subset of the activated cells to an SpCell or an SCell, where the L1/L2 signaling is received from the network entity, and the UE may apply the configuration for the at least one activated cell based on the L1/L2 signaling, such as described in connection with FIGS. 7 to 17. For example, at 1728 and 1730 of FIG. 17, the UE 1702 may receive an L1/L2 inter-cell mobility signaling from the base station 1704, and the UE 1702 may apply the configuration 1706 for the at least one activated cell based on the L1/L2 signaling. The reception of the L1/L2 signaling to update at least one activated cell and/or the application of the configuration for the at least one activated cell based on the L1/L2 signaling may be performed by, e.g., the delta configuration process component 198, the cellular baseband processor 2024, and/or the transceiver(s) 2022 of the apparatus 2004 in FIG. 20.

At 1908, the UE may receive an indication of an updated configuration for the set of cells based on a movement of the UE, where the indication of the updated configuration is received from the network entity, where the updated configuration includes at least one new cell in the set of cells, such as described in connection with FIGS. 7 to 17. For example, at 1732 of FIG. 17, the UE 1702 may receive an updated configuration 1710 for the set of cells 1708, where the updated configuration includes at least one new cell in the set of cells 1708. The reception of the indication of the updated configuration may be performed by, e.g., the delta configuration process component 198, the cellular baseband processor 2024, and/or the transceiver(s) 2022 of the apparatus 2004 in FIG. 20.

Figure 20:
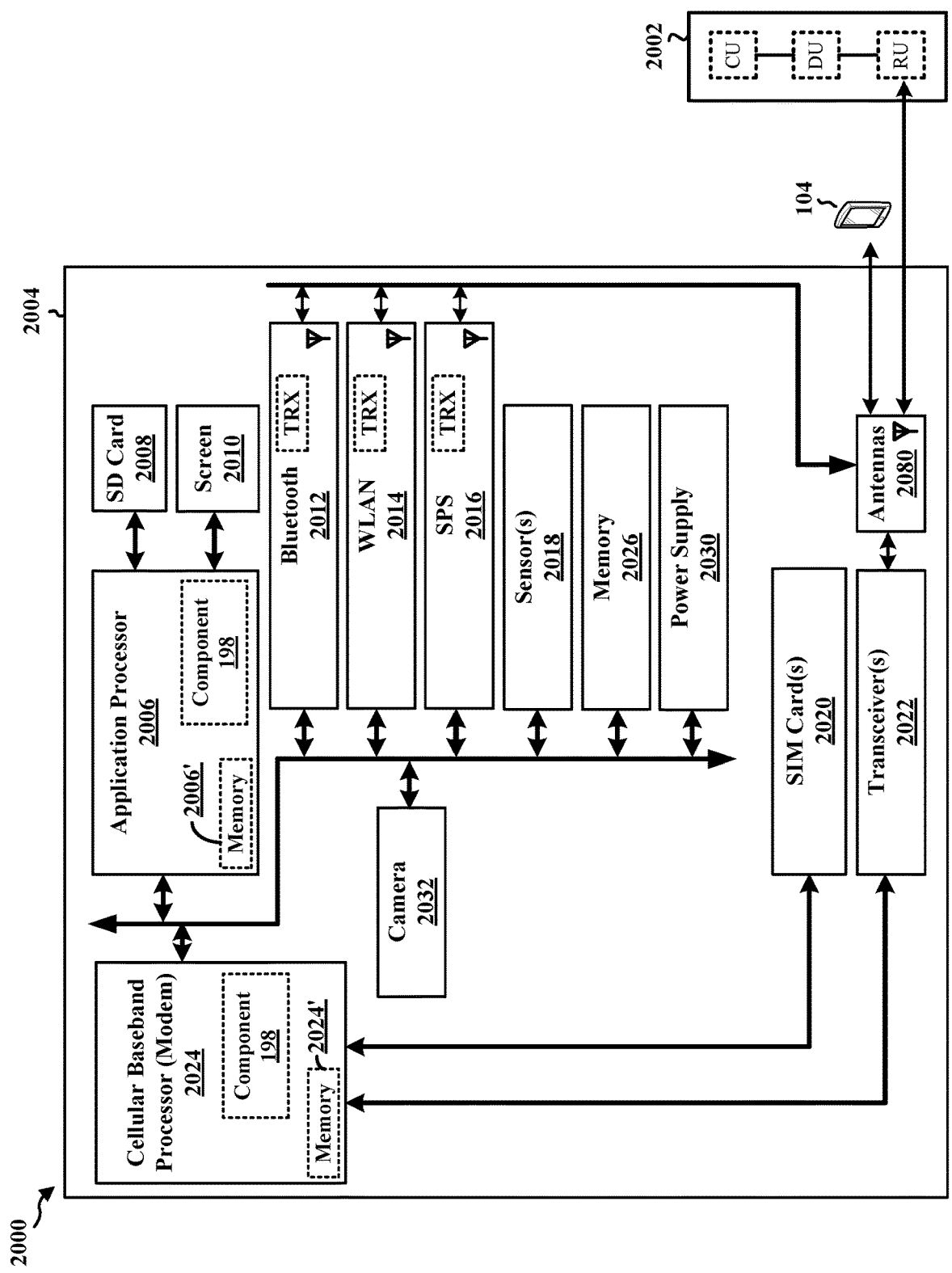
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include a cellular baseband processor 2024 (also referred to as a modem) coupled to one or more transceivers 2022 (e.g., cellular RF transceiver). The cellular baseband processor 2024 may include on-chip memory 2024'. In some aspects, the apparatus 2004 may further include one or more subscriber identity modules (SIM) cards 2020 and an application processor 2006 coupled to a secure digital (SD) card 2008 and a screen 2010. The application processor 2006 may include on-chip memory 2006'. In some aspects, the apparatus 2004 may further include a Bluetooth module 2012, a WLAN module 2014, an SPS module 2016 (e.g., GNSS module), one or more sensor modules 2018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the SPS module 2016 may include an on-chip transceiver (TRX) (or in some cases, just a receiver (RX)). The Bluetooth module 2012, the WLAN module 2014, and the SPS module 2016 may include their own dedicated antennas and/or utilize the antennas 2080 for communication. The cellular baseband processor 2024 communicates through the transceiver(s) 2022 via one or more antennas 2080 with the UE 104 and/or with an RU associated with a network entity 2002. The cellular baseband processor 2024 and the application processor 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor 2024 and the application processor 2006 are each responsible for general processing, including the execution of software stored on the computer-readable medium/memory. The software, when executed by the cellular baseband processor 2024/application processor 2006, causes the cellular baseband processor 2024/application processor 2006 to perform the various functions described supra. The computer-readable medium/memory may also be used for storing data that is manipulated by the cellular baseband processor 2024/application processor 2006 when executing software. The cellular baseband processor 2024/application processor 2006 may be a component of the UE 350 and may include the memory 360 and/or at least one of the TX processor 368, the RX processor 356, and the controller/processor 359. In one configuration, the apparatus 2004 may be a processor chip (modem and/or application) and include just the cellular baseband processor 2024 and/or the application processor 2006, and in another configuration, the apparatus 2004 may be the entire UE (e.g., see 350 of FIG. 3) and include the additional modules of the apparatus 2004.

As discussed supra, the delta configuration process component 198 may be configured to receive a configuration for a set of cells associated with a mobility of the UE, where the configuration for the set of cells is received from a network entity, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell. The delta configuration process component 198 may also be configured to receive an indication of an updated configuration for the set of cells based on a movement of the UE, where the indication of the updated configuration is received from the network entity, where the updated configuration includes at least one new cell in the set of cells. The delta configuration process component 198 may be within the cellular baseband processor 2024, the application processor 2006, or both the cellular baseband processor 2024 and the application processor 2006. The delta configuration process component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2004 may include a variety of components configured for various functions. In one configuration, the apparatus 2004, and in particular the cellular baseband processor 2024 and/or the application processor 2006, may include means for receiving a configuration for a set of cells associated with a mobility of the UE, where the configuration for the set of cells is received from a network entity, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell. The apparatus 2004 may further include means for receiving an indication of an updated configuration for the set of cells based on a movement of the UE, where the indication of the updated configuration is received from the network entity, where the updated configuration includes at least one new cell in the set of cells.

In one example, the configuration includes a set of parameters including at least one of: a cell index, an SSB measurement timing, a cell group ID, or a combination thereof.

In another example, the configuration includes a set of delta configuration parameters for the one or more second cells of the set of cells with respect to the at least one first cell of the set of cells.

In another example, each of the at least one first cell of the set of cells is associated with a number of other cells in the set of cells as a group, and where the configuration includes a full configuration for the at least one first cell of the set of cells and one or more delta configurations for the number of other cells.

In another example, each of the at least one first cell of the set of cells is associated with a number of other cells in the set of cells as a group, and where the configuration includes a full configuration for the at least one first cell of the set of cells and the number of other cells.

In another example, the configuration is a delta configuration associated with an L1/L2 mobility of the UE. In such an example, the delta configuration includes a set of delta parameters including at least one of: an SpCell configuration, a L1 measurement or reporting configuration for the second subset of deactivated cells, a general cell configuration, or a combination thereof.

In another example, the reference cell is an SpCell or an SCell.

In another example, the configuration for the set of cells is received via L3 signaling or RRC signaling.

In another example, the configuration indicates that a second set of configuration parameters for the one or more second cells of the set of cells is equivalent to a first set of configuration parameters for the at least one first cell of the set of cells.

In another example, the apparatus 2004 may further include means for receiving a list of the second subset of the deactivated cells from the network entity, and means for adding at least one deactivated cell in the second subset of the deactivated cells to the first subset of the activated cells based on the mobility of the UE and the configuration.

In another example, the apparatus 2004 may further include means for receiving L1/L2 signaling to update at least one activated cell in the first subset of the activated cells to an SpCell or an SCell, where the L1/L2 signaling is received from the network entity, and means for applying the configuration for the at least one activated cell based on the L1/L2 signaling.

The means may be the delta configuration process component 198 of the apparatus 2004 configured to perform the functions recited by the means. As described supra, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 21:
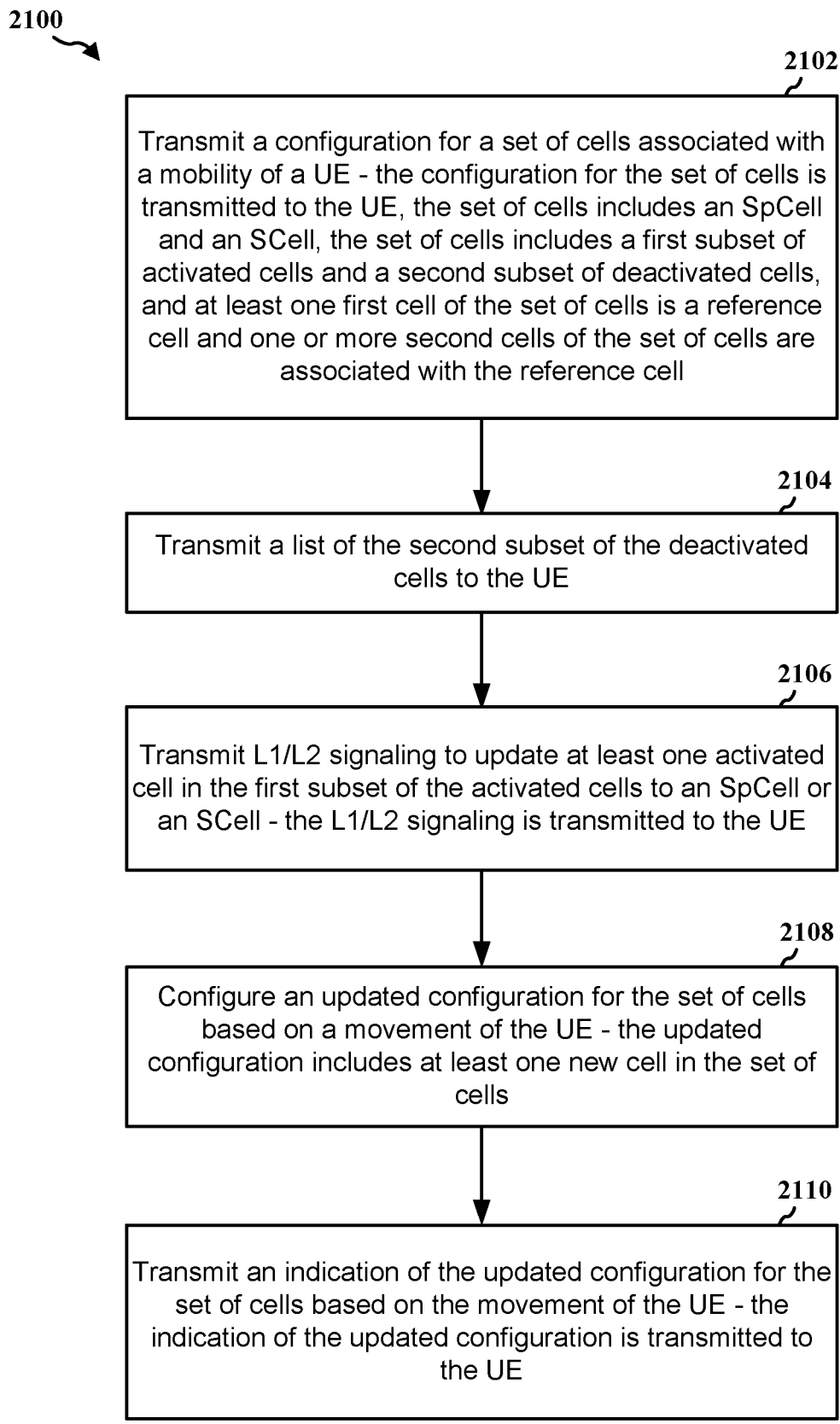
FIG. 21 is a flowchart of a method of wireless communication.

FIG. 21 is a flowchart 2100 of a method of wireless communication. The method may be performed by a base station (e.g., the base station 104, 404, 604, 704, 1704; the network entity 2302). The method may enable the base station to configure a UE with delta configuration for one or more cells and perform handover of the UE between cells based on L1/L2 signaling.

At 2102, the base station may transmit a configuration for a set of cells associated with a mobility of a UE, where the configuration for the set of cells is transmitted to the UE, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell, such as described in connection with FIGS. 7 to 17. For example, at 1720 of FIG. 17, the base station 1704 may transmit a delta configuration 1706 for a set of cells 1708 to the UE 1702 that is associated with a mobility of the UE 1702, where the set of cells 1708 includes SpCell and SCell capability/configuration, activated cells and deactivated cells, and at least one reference cell. The transmission of the configuration may be performed by, e.g., the delta configuration signaling component 199 and/or the transceiver(s) 2346 of the network entity 2302 in FIG. 23.

In one example, the configuration includes a set of parameters including at least one of: a cell index, an SSB measurement timing, a cell group ID, or a combination thereof.

In another example, the configuration includes a set of delta configuration parameters for the one or more second cells of the set of cells with respect to the at least one first cell of the set of cells.

In another example, each of the at least one first cell of the set of cells is associated with a number of other cells in the set of cells as a group, and where the configuration includes a full configuration for the at least one first cell of the set of cells and one or more delta configurations for the number of other cells.

In another example, each of the at least one first cell of the set of cells is associated with a number of other cells in the set of cells as a group, and where the configuration includes a full configuration for the at least one first cell of the set of cells and the number of other cells.

In another example, the configuration is a delta configuration associated with an L1/L2 mobility of the UE. In such an example, the delta configuration includes a set of delta parameters including at least one of: an SpCell configuration, a L1 measurement or reporting configuration for the second subset of deactivated cells, a general cell configuration, or a combination thereof.

In another example, the reference cell is an SpCell or an SCell.

In another example, the configuration for the set of cells is transmitted via L3 signaling or RRC signaling.

In another example, the configuration indicates that a second set of configuration parameters for the one or more second cells of the set of cells is equivalent to a first set of configuration parameters for the at least one first cell of the set of cells.

In another example, the network entity is a DU of a base station.

At 2104, the base station may transmit a list of the second subset of the deactivated cells to the UE, such as described in connection with FIGS. 7 to 17. For example, at 1724 of FIG. 17, the base station 1704 may transmit a list of deactivated cells to the UE 1702. The transmission of the list of the second subset of the deactivated cells may be performed by, e.g., the delta configuration signaling component 199 and/or the transceiver(s) 2346 of the network entity 2302 in FIG. 23.

At 2106, the base station may transmit L1/L2 signaling to update at least one activated cell in the first subset of the activated cells to an SpCell or an SCell, where the L1/L2 signaling is transmitted to the UE, such as described in connection with FIGS. 7 to 17. For example, at 1728 of FIG. 17, the base station 1704 may transmit an L1/L2 inter-cell mobility signaling to the UE 1702. The transmission of the L1/L2 signaling to update at least one activated cell may be performed by, e.g., the delta configuration signaling component 199 and/or the transceiver(s) 2346 of the network entity 2302 in FIG. 23.

At 2108, the base station may configure an updated configuration for the set of cells based on a movement of the UE, where the updated configuration includes at least one new cell in the set of cells, such as described in connection with FIGS. 7 to 17. For example, at 1730 of FIG. 17, the base station 1704 may configure an updated configuration 1710 for the set of cells 1708 based on a movement of the UE, where the updated configuration includes at least one new cell in the set of cells 1708. The configuration of the updated configuration may be performed by, e.g., the delta configuration signaling component 199 and/or the transceiver(s) 2346 of the network entity 2302 in FIG. 23.

At 2110, the base station may transmit an indication of the updated configuration for the set of cells based on the movement of the UE, where the indication of the updated configuration is transmitted to the UE, such as described in connection with FIGS. 7 to 17. For example, at 1732 of FIG. 17, the base station 1704 may transmit an updated configuration 1710 for the set of cells 1708 to the UE 1702. The transmission of the indication of the updated configuration may be performed by, e.g., the delta configuration signaling component 199 and/or the transceiver(s) 2346 of the network entity 2302 in FIG. 23.

Figure 22:
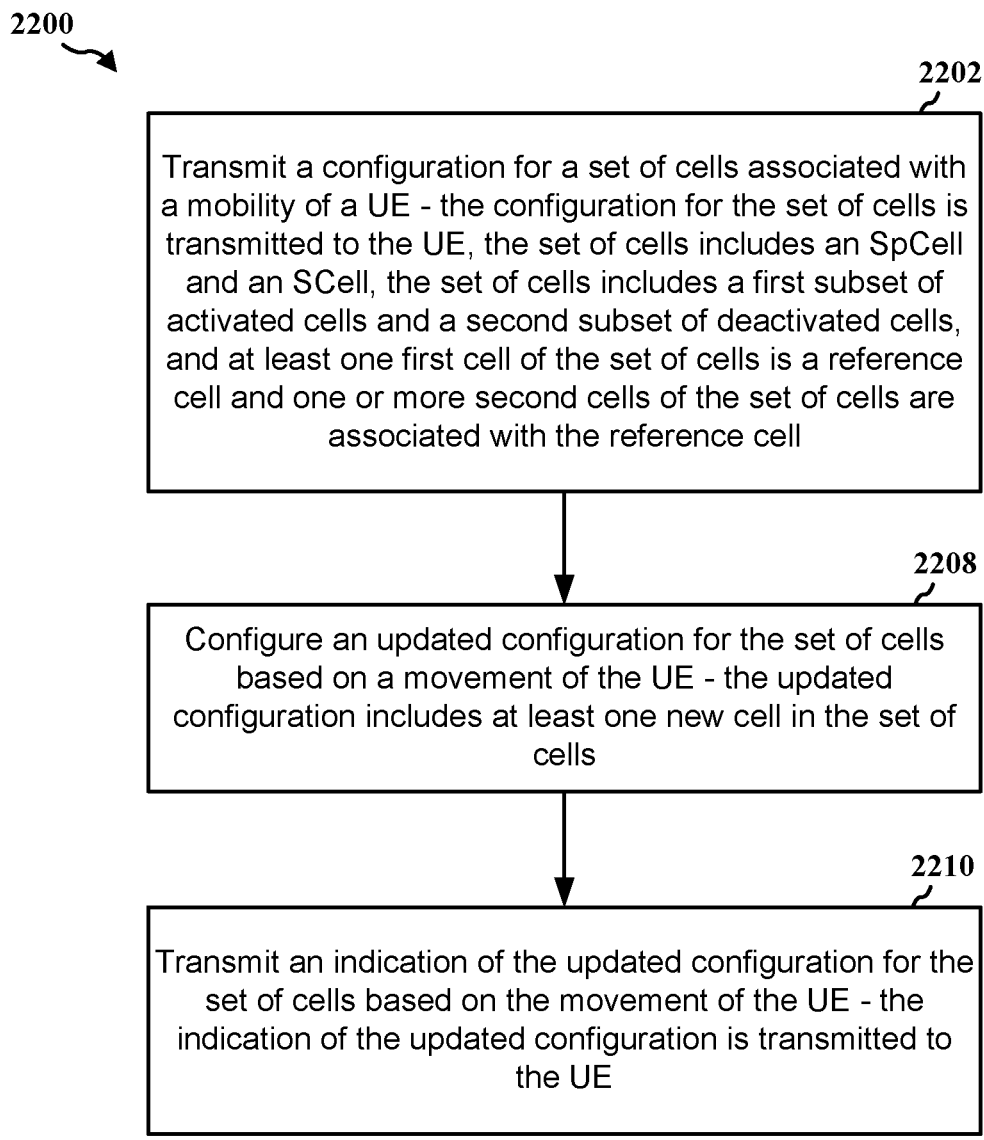
FIG. 22 is a flowchart of a method of wireless communication.

FIG. 22 is a flowchart 2200 of a method of wireless communication. The method may be performed by a base station (e.g., the base station 104, 404, 604, 704, 1704; the network entity 2302). The method may enable the base station to configure a UE with delta configuration for one or more cells and perform handover of the UE between cells based on L1/L2 signaling.

At 2202, the base station may transmit a configuration for a set of cells associated with a mobility of a UE, where the configuration for the set of cells is transmitted to the UE, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell, such as described in connection with FIGS. 7 to 17. For example, at 1720 of FIG. 17, the base station 1704 may transmit a delta configuration 1706 for a set of cells 1708 to the UE1702 that is associated with a mobility of the UE 1702, where the set of cells 1708 includes SpCell and SCell capability/configuration, activated cells and deactivated cells, and at least one reference cell. The transmission of the configuration may be performed by, e.g., the delta configuration signaling component 199 and/or the transceiver(s) 2346 of the network entity 2302 in FIG. 23.

In one example, the configuration includes a set of parameters including at least one of: a cell index, an SSB measurement timing, a cell group ID, or a combination thereof.

In another example, the configuration includes a set of delta configuration parameters for the one or more second cells of the set of cells with respect to the at least one first cell of the set of cells.

In another example, each of the at least one first cell of the set of cells is associated with a number of other cells in the set of cells as a group, and where the configuration includes a full configuration for the at least one first cell of the set of cells and one or more delta configurations for the number of other cells.

In another example, each of the at least one first cell of the set of cells is associated with a number of other cells in the set of cells as a group, and where the configuration includes a full configuration for the at least one first cell of the set of cells and the number of other cells.

In another example, the configuration is a delta configuration associated with an L1/L2 mobility of the UE. In such an example, the delta configuration includes a set of delta parameters including at least one of: an SpCell configuration, a L1 measurement or reporting configuration for the second subset of deactivated cells, a general cell configuration, or a combination thereof.

In another example, the reference cell is an SpCell or an SCell.

In another example, the configuration for the set of cells is transmitted via L3 signaling or RRC signaling.

In another example, the configuration indicates that a second set of configuration parameters for the one or more second cells of the set of cells is equivalent to a first set of configuration parameters for the at least one first cell of the set of cells.

In another example, the network entity is a DU of a base station.

In another example, the base station may transmit a list of the second subset of the deactivated cells to the UE, such as described in connection with FIGS. 7 to 17. For example, at 1724 of FIG. 17, the base station 1704 may transmit a list of deactivated cells to the UE 1702. The transmission of the list of the second subset of the deactivated cells may be performed by, e.g., the delta configuration signaling component 199 and/or the transceiver(s) 2346 of the network entity 2302 in FIG. 23.

In another example, the base station may transmit L1/L2 signaling to update at least one activated cell in the first subset of the activated cells to an SpCell or an SCell, where the L1/L2 signaling is transmitted to the UE, such as described in connection with FIGS. 7 to 17. For example, at 1728 of FIG. 17, the base station 1704 may transmit an L1/L2 inter-cell mobility signaling to the UE 1702. The transmission of the L1/L2 signaling to update at least one activated cell may be performed by, e.g., the delta configuration signaling component 199 and/or the transceiver(s) 2346 of the network entity 2302 in FIG. 23.

At 2208, the base station may configure an updated configuration for the set of cells based on a movement of the UE, where the updated configuration includes at least one new cell in the set of cells, such as described in connection with FIGS. 7 to 17. For example, at 1730 of FIG. 17, the base station 1704 may configure an updated configuration 1710 for the set of cells 1708 based on a movement of the UE, where the updated configuration includes at least one new cell in the set of cells 1708. The configuration of the updated configuration may be performed by, e.g., the delta configuration signaling component 199 and/or the transceiver(s) 2346 of the network entity 2302 in FIG. 23.

At 2210, the base station may transmit an indication of the updated configuration for the set of cells based on the movement of the UE, where the indication of the updated configuration is transmitted to the UE, such as described in connection with FIGS. 7 to 17. For example, at 1732 of FIG. 17, the base station 1704 may transmit an updated configuration 1710 for the set of cells 1708 to the UE 1702. The transmission of the indication of the updated configuration may be performed by, e.g., the delta configuration signaling component 199 and/or the transceiver(s) 2346 of the network entity 2302 in FIG. 23.

Figure 23:
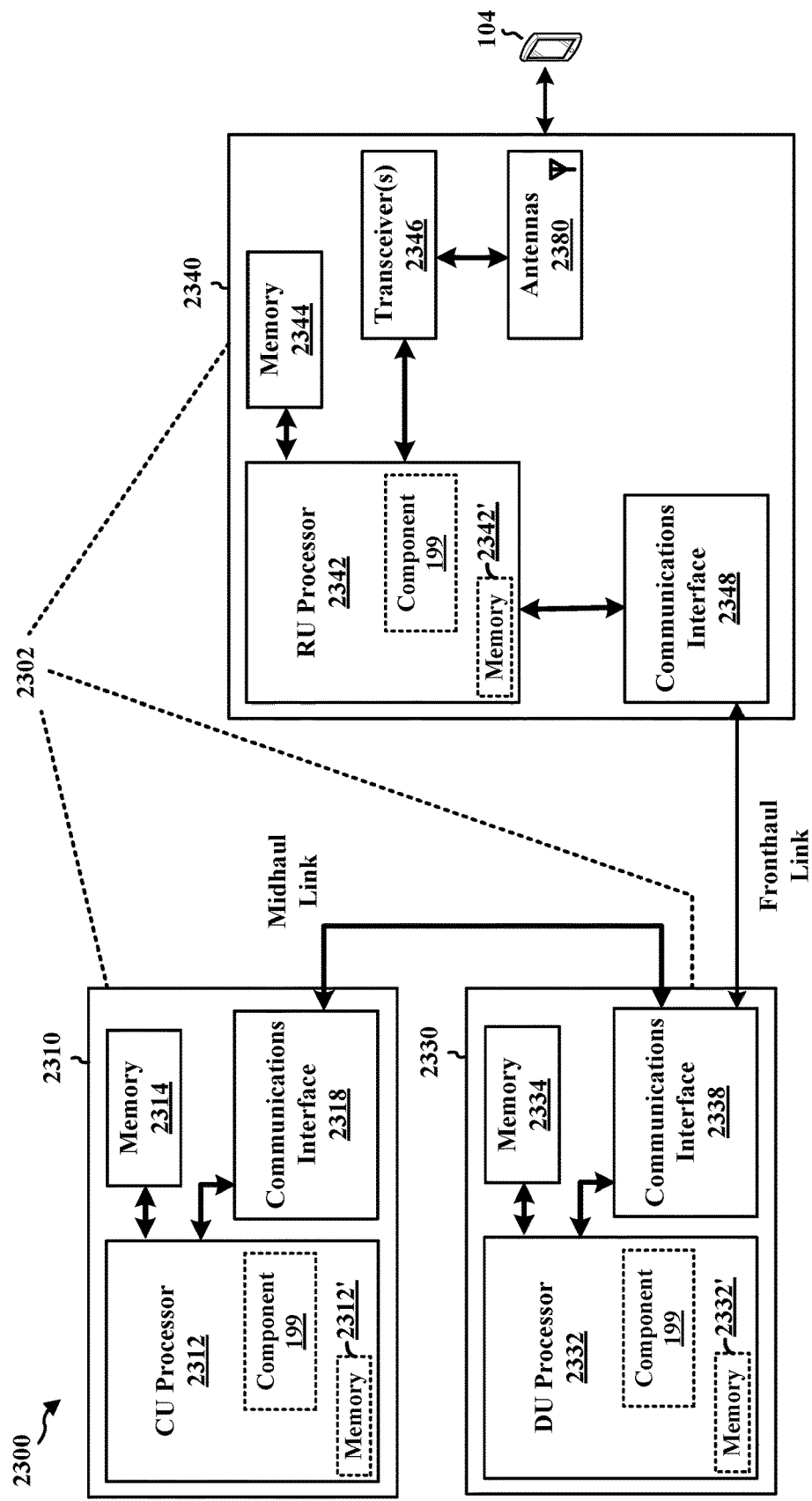
FIG. 23 is a diagram illustrating an example of a hardware implementation for an example apparatus and/or network entity.

FIG. 23 is a diagram 2300 illustrating an example of a hardware implementation for a network entity 2302. The network entity 2302 may be a BS, a component of a BS, or may implement BS functionality. The network entity 2302 may include at least one of a CU 2310, a DU 2330, or an RU 2340. For example, depending on the layer functionality handled by the component 199, the network entity 2302 may include the CU 2310; both the CU 2310 and the DU 2330; each of the CU 2310, the DU 2330, and the RU 2340; the DU 2330; both the DU 2330 and the RU 2340; or the RU 2340. The CU 2310 may include a CU processor 2312. The CU processor 2312 may include on-chip memory 2312'. In some aspects, the CU 2310 may further include additional memory modules 2314 and a communications interface 2318. The CU 2310 communicates with the DU 2330 through a midhaul link, such as an F1 interface. The DU 2330 may include a DU processor 2332. The DU processor 2332 may include on-chip memory 2332'. In some aspects, the DU 2330 may further include additional memory modules 2334 and a communications interface 2338. The DU 2330 communicates with the RU 2340 through a fronthaul link. The RU 2340 may include an RU processor 2342. The RU processor 2342 may include on-chip memory 2342'. In some aspects, the RU 2340 may further include additional memory modules 2344, one or more transceivers 2346, antennas 2380, and a communications interface 2348. The RU 2340 communicates with the UE 104. The on-chip memory 2312', 2332', 2342' and the additional memory modules 2314, 2334, 2344 may each be considered a computer-readable medium/memory. Each computer-readable medium/memory may be non-transitory. Each of the processors 2312, 2332, 2342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the delta configuration signaling component 199 may be configured to transmit a configuration for a set of cells associated with a mobility of a UE, where the configuration for the set of cells is transmitted to the UE, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell. The delta configuration signaling component 199 may also be configured to configure an updated configuration for the set of cells based on a movement of the UE, where the updated configuration includes at least one new cell in the set of cells. The delta configuration signaling component 199 may also be configured to transmit an indication of the updated configuration for the set of cells based on the movement of the UE, where the indication of the updated configuration is transmitted to the UE. The delta configuration signaling component 199 may be within one or more processors of one or more of the CU 2310, DU 2330, and the RU 2340. The delta configuration signaling component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2302 may include a variety of components configured for various functions. In one configuration, the network entity 2302 may include means for transmitting a configuration for a set of cells associated with a mobility of a UE, where the configuration for the set of cells is transmitted to the UE, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell. The network entity 2302 may further include means for configuring an updated configuration for the set of cells based on a movement of the UE, where the updated configuration includes at least one new cell in the set of cells. The network entity 2302 may further include means for transmitting an indication of the updated configuration for the set of cells based on the movement of the UE, where the indication of the updated configuration is transmitted to the UE.

In one example, the configuration includes a set of parameters including at least one of: a cell index, an SSB measurement timing, a cell group ID, or a combination thereof.

In another example, the configuration includes a set of delta configuration parameters for the one or more second cells of the set of cells with respect to the at least one first cell of the set of cells.

In another example, each of the at least one first cell of the set of cells is associated with a number of other cells in the set of cells as a group, and where the configuration includes a full configuration for the at least one first cell of the set of cells and one or more delta configurations for the number of other cells.

In another example, each of the at least one first cell of the set of cells is associated with a number of other cells in the set of cells as a group, and where the configuration includes a full configuration for the at least one first cell of the set of cells and the number of other cells.

In another example, the configuration is a delta configuration associated with an L1/L2 mobility of the UE. In such an example, the delta configuration includes a set of delta parameters including at least one of: an SpCell configuration, a L1 measurement or reporting configuration for the second subset of deactivated cells, a general cell configuration, or a combination thereof.

In another example, the reference cell is an SpCell or an SCell.

In another example, the configuration for the set of cells is transmitted via L3 signaling or RRC signaling.

In another example, the configuration indicates that a second set of configuration parameters for the one or more second cells of the set of cells is equivalent to a first set of configuration parameters for the at least one first cell of the set of cells.

In another example, the network entity is a DU of a base station.

In another example, the network entity 2302 may further include means for transmitting a list of the second subset of the deactivated cells to the UE.

In another example, the network entity 2302 may further include means for transmitting L1/L2 signaling to update at least one activated cell in the first subset of the activated cells to an SpCell or an SCell, where the L1/L2 signaling is transmitted to the UE.

The means may be the delta configuration signaling component 199 of the network entity 2302 configured to perform the functions recited by the means. As described supra, the network entity 2302 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving a configuration for a set of cells associated with a mobility of the UE, where the configuration for the set of cells is received from a network entity, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell; and receiving an indication of an updated configuration for the set of cells based on a movement of the UE, where the indication of the updated configuration is received from the network entity, where the updated configuration includes at least one new cell in the set of cells.

Aspect 2 is the method of aspect 1, where the configuration includes a set of parameters including at least one of: a cell index, an SSB measurement timing, a cell group ID, or a combination thereof.

Aspect 3 is the method of any of aspects 1 or 2, where the configuration includes a set of delta configuration parameters for the one or more second cells of the set of cells with respect to the at least one first cell of the set of cells.

Aspect 4 is the method of any of aspects 1 to 3, where each of the at least one first cell of the set of cells is associated with a number of other cells in the set of cells as a group, and where the configuration includes a full configuration for the at least one first cell of the set of cells and one or more delta configurations for the number of other cells.

Aspect 5 is the method of any of aspects 1 to 4, where each of the at least one first cell of the set of cells is associated with a number of other cells in the set of cells as a group, and where the configuration includes a full configuration for the at least one first cell of the set of cells and the number of other cells.

Aspect 6 is the method of any of aspects 1 to 5, where the configuration is a delta configuration associated with an L1/L2 mobility of the UE.

Aspect 7 is the method of aspect 6, where the delta configuration includes a set of delta parameters including at least one of: an SpCell configuration, an L1 measurement or reporting configuration for the second subset of deactivated cells, a general cell configuration, or a combination thereof.

Aspect 8 is the method of any of aspects 1 to 7, further including: receiving a list of the second subset of the deactivated cells from the network entity; and adding at least one deactivated cell in the second subset of the deactivated cells to the first subset of the activated cells based on the mobility of the UE and the configuration.

Aspect 9 is the method of any of aspects 1 to 8, further including: receiving L1/L2 signaling to update at least one activated cell in the first subset of the activated cells to an SpCell or an SCell, where the L1/L2 signaling is received from the network entity; and applying the configuration for the at least one activated cell based on the L1/L2 signaling.

Aspect 10 is the method of any of aspects 1 to 9, where the reference cell is an SpCell or an SCell.

Aspect 11 is the method of any of aspects 1 to 10, where the configuration for the set of cells is received via L3 signaling or RRC signaling.

Aspect 12 is the method of any of aspects 1 to 11, where the configuration indicates that a second set of configuration parameters for the one or more second cells of the set of cells is equivalent to a first set of configuration parameters for the at least one first cell of the set of cells.

Aspect 13 is an apparatus for wireless communication at a UE, including: a memory; and at least one processor coupled to the memory and, based at least in part on information stored in the memory, the at least one processor is configured to implement any of aspects 1 to 12.

Aspect 14 is the apparatus of aspect 13, further including at least one of a transceiver or an antenna coupled to the at least one processor.

Aspect 15 is an apparatus for wireless communication including means for implementing any of aspects 1 to 12.

Aspect 16 is a computer-readable medium (e.g., a non-transitory computer-readable medium) storing computer executable code, where the code when executed by a processor causes the processor to implement any of aspects 1 to 12.

Aspect 17 is a method of wireless communication at a base station, including: transmitting a configuration for a set of cells associated with a mobility of a UE, where the configuration for the set of cells is transmitted to the UE, where the set of cells includes an SpCell and an SCell, where the set of cells includes a first subset of activated cells and a second subset of deactivated cells, where at least one first cell of the set of cells is a reference cell and one or more second cells of the set of cells are associated with the reference cell; configuring an updated configuration for the set of cells based on a movement of the UE, where the updated configuration includes at least one new cell in the set of cells; and transmitting an indication of the updated configuration for the set of cells based on the movement of the UE, where the indication of the updated configuration is transmitted to the UE.

Aspect 18 is the method of aspect 17, where the configuration includes a set of parameters including at least one of: a cell index, an SSB measurement timing, a cell group ID, or a combination thereof.

Aspect 19 is the method of aspect 17 or 18, where the configuration includes a set of delta configuration parameters for the one or more second cells of the set of cells with respect to the at least one first cell of the set of cells.

Aspect 20 is the method of any of aspects 17 to 19, where each of the at least one first cell of the set of cells is associated with a number of other cells in the set of cells as a group, and where the configuration includes a full configuration for the at least one first cell of the set of cells and one or more delta configurations for the number of other cells.

Aspect 21 is the method of any of aspects 17 to 20, where each of the at least one first cell of the set of cells is associated with a number of other cells in the set of cells as a group, and where the configuration includes a full configuration for the at least one first cell of the set of cells and the number of other cells.

Aspect 22 is the method of any of aspects 17 to 21, where the configuration is a delta configuration associated with an L1/L2 mobility of the UE.

Aspect 23 is the method of aspect 22, where the delta configuration includes a set of delta parameters including at least one of: an SpCell configuration, an L1 measurement or reporting configuration for the second subset of deactivated cells, a general cell configuration, or a combination thereof.

Aspect 24 is the method of any of aspects 17 to 23, further including: transmitting a list of the second subset of the deactivated cells to the UE.

Aspect 25 is the method of any of aspects 17 to 24, further including: transmitting L1/L2 signaling to update at least one activated cell in the first subset of the activated cells to an SpCell or an SCell, where the L1/L2 signaling is transmitted to the UE.

Aspect 26 is the method of any of aspects 17 to 25, where the reference cell is an SpCell or an SCell.

Aspect 27 is the method of any of aspects 17 to 26, where the configuration for the set of cells is transmitted via L3 signaling or RRC signaling.

Aspect 28 is the method of any of aspects 17 to 27, where the configuration indicates that a second set of configuration parameters for the one or more second cells of the set of cells is equivalent to a first set of configuration parameters for the at least one first cell of the set of cells.

Aspect 29 is the method of any of aspects 17 to 28, where the network entity is a DU of a base station.

Aspect 30 is an apparatus for wireless communication at a base station, including: a memory; and at least one processor coupled to the memory and, based at least in part on information stored in the memory, the at least one processor is configured to implement any of aspects 17 to 29.

Aspect 31 is the apparatus of aspect 30, further including at least one of a transceiver or an antenna coupled to the at least one processor.

Aspect 32 is an apparatus for wireless communication including means for implementing any of aspects 17 to 31.

Aspect 33 is a computer-readable medium (e.g., a non-transitory computer-readable medium) storing computer executable code, where the code when executed by a processor causes the processor to implement any of aspects 17 to 32.

What is claimed is:

1. An apparatus for wireless communication at a user equipment (UE), comprising:
   at least one memory; and
   at least one processor coupled to the at least one memory and, based at least in part on information stored in the at least one memory, the at least one processor is configured to:
   receive a configuration for a set of cells associated with a mobility of the UE, wherein the configuration for the set of cells is received from a network entity, wherein the set of cells includes a special cell (SpCell) and a secondary cell (SCell), wherein the set of cells includes a first subset of activated cells and a second subset of deactivated cells, wherein at least one SCell in the set of cells is a reference cell and one or more cells of the set of cells are associated with the reference cell, wherein the configuration includes a set of delta configuration parameters for the one or more cells of the set of cells with respect to the at least one SCell in the set of cells; and
   receive an indication of an updated configuration for the set of cells based on a movement of the UE, wherein the indication of the updated configuration is received from the network entity, wherein the updated configuration includes at least one new cell in the set of cells.

2. The apparatus of claim 1, wherein the configuration includes a set of parameters including at least one of:
   a cell index,
   an SSB measurement timing,
   a cell group ID, or
   a combination thereof.

3. The apparatus of claim 1, wherein each of the at least one SCell in the set of cells is associated with a number of other cells in the set of cells as a group, and wherein the configuration includes a full configuration for the at least one SCell in the set of cells and one or more delta configurations for the number of other cells.

4. The apparatus of claim 1, wherein each of the at least one SCell in the set of cells is associated with a number of other cells in the set of cells as a group, and wherein the configuration includes a full configuration for the at least one SCell in the set of cells and the number of other cells.

5. The apparatus of claim 1, wherein the configuration is a delta configuration associated with a layer one or layer two (L1/L2) mobility of the UE.

6. The apparatus of claim 5, wherein the delta configuration includes a set of delta parameters including at least one of:
an SpCell configuration,
a layer one (L1) measurement or reporting configuration for the second subset of deactivated cells,
a general cell configuration, or
a combination thereof.

7. The apparatus of claim 1, wherein the at least one processor is further configured to:
receive a list of the second subset of the deactivated cells from the network entity; and
add at least one deactivated cell in the second subset of the deactivated cells to the first subset of the activated cells based on the mobility of the UE and the configuration.

8. The apparatus of claim 1, wherein the at least one processor is further configured to:
receive layer one or layer two (L1/L2) signaling to update at least one activated cell in the first subset of the activated cells to an SpCell or an SCell, wherein the L1/L2 signaling is received from the network entity; and
apply the configuration for the at least one activated cell based on the L1/L2 signaling.

9. The apparatus of claim 1, wherein the configuration for the set of cells is received via layer three (L3) signaling or radio resource control (RRC) signaling.

10. The apparatus of claim 1, wherein the configuration indicates that a second set of configuration parameters for the one or more cells of the set of cells is equivalent to a first set of configuration parameters for the at least one SCell in the set of cells.

11. A method of wireless communication at a user equipment (UE), comprising:
receiving a configuration for a set of cells associated with a mobility of the UE, wherein the configuration for the set of cells is received from a network entity, wherein the set of cells includes a special cell (SpCell) and a secondary cell (SCell), wherein the set of cells includes a first subset of activated cells and a second subset of deactivated cells, wherein at least one SCell in the set of cells is a reference cell and one or more second-cells of the set of cells are associated with the reference cell, wherein the configuration includes a set of delta configuration parameters for the one or more cells of the set of cells with respect to the at least one SCell in the set of cells; and
receiving an indication of an updated configuration for the set of cells based on a movement of the UE, wherein the indication of the updated configuration is received from the network entity, wherein the updated configuration includes at least one new cell in the set of cells.

12. The method of claim 11, wherein each of the at least one SCell in the set of cells is associated with a number of other cells in the set of cells as a group, and wherein the configuration includes a full configuration for the at least one SCell in the set of cells and one or more delta configurations for the number of other cells.

13. The method of claim 11, wherein each of the at least one SCell in the set of cells is associated with a number of other cells in the set of cells as a group, and wherein the configuration includes a full configuration for the at least one SCell in the set of cells and the number of other cells.

14. The method of claim 11, wherein the configuration is a delta configuration associated with a layer one or layer two (L1/L2) mobility of the UE.

15. The method of claim 11, further comprising:
receiving a list of the second subset of the deactivated cells from the network entity; and
adding at least one deactivated cell in the second subset of the deactivated cells to the first subset of the activated cells based on the mobility of the UE and the configuration.

16. The method of claim 11, further comprising:
receiving layer one or layer two (L1/L2) signaling to update at least one activated cell in the first subset of the activated cells to an SpCell or an SCell, wherein the L1/L2 signaling is received from the network entity; and
applying the configuration for the at least one activated cell based on the L1/L2 signaling.

17. The method of claim 11, wherein the configuration indicates that a second set of configuration parameters for the one or more cells of the set of cells is equivalent to a first set of configuration parameters for the at least one SCell in the set of cells.

18. An apparatus for wireless communication at a network entity, comprising:
at least one memory; and
at least one processor coupled to the at least one memory and, based at least in part on information stored in the at least one memory, the at least one processor is configured to:
transmit a configuration for a set of cells associated with a mobility of a user equipment (UE), wherein the configuration for the set of cells is transmitted to the UE, wherein the set of cells includes a special cell (SpCell) and a secondary cell (SCell), wherein the set of cells includes a first subset of activated cells and a second subset of deactivated cells, wherein at least one SCell in the set of cells is a reference cell and one or more cells of the set of cells are associated with the reference cell, wherein the configuration includes a set of delta configuration parameters for the one or more cells of the set of cells with respect to the at least one SCell in the set of cells;
configure an updated configuration for the set of cells based on a movement of the UE, wherein the updated configuration includes at least one new cell in the set of cells; and
transmit an indication of the updated configuration for the set of cells based on the movement of the UE, wherein the indication of the updated configuration is transmitted to the UE.

19. The apparatus of claim 18, wherein each of the at least one SCell in the set of cells is associated with a number of other cells in the set of cells as a group, and wherein the configuration includes a full configuration for the at least one SCell in the set of cells and one or more delta configurations for the number of other cells.

20. The apparatus of claim 18, wherein each of the at least one the set of cells is associated with a number of other cells in the set of cells as a group, and wherein the configuration includes a full configuration for the at least one SCell in the set of cells and the number of other cells.

21. The apparatus of claim 18, wherein the configuration is a delta configuration associated with a layer one or layer two (L1/L2) mobility of the UE.

22. The apparatus of claim 18, wherein the at least one processor is further configured to:
    transmit a list of the second subset of the deactivated cells to the UE.

23. The apparatus of claim 18, wherein the at least one processor is further configured to:
    transmit layer one or layer two (L1/L2) signaling to update at least one activated cell in the first subset of the activated cells to an SpCell or an SCell, wherein the L1/L2 signaling is transmitted to the UE.

24. The apparatus of claim 18, wherein the configuration indicates that a second set of configuration parameters for the one or more cells of the set of cells is equivalent to a first set of configuration parameters for the at least one SCell in the set of cells.

25. The apparatus of claim 18, wherein the network entity is a distribute unit (DU) of a base station.

26. A method of wireless communication at a network entity, comprising:
    transmitting a configuration for a set of cells associated with a mobility of a user equipment (UE), wherein the configuration for the set of cells is transmitted to the UE, wherein the set of cells includes a special cell (SpCell) and a secondary cell (SCell), wherein the set of cells includes a first subset of activated cells and a second subset of deactivated cells, wherein at least one SCell in the set of cells is a reference cell and one or more cells of the set of cells are associated with the reference cell, wherein the configuration includes a set of delta configuration parameters for the one or more cells of the set of cells with respect to the at least one SCell in the set of cells;
    configuring an updated configuration for the set of cells based on a movement of the UE, wherein the updated configuration includes at least one new cell in the set of cells; and
    transmitting an indication of the updated configuration for the set of cells based on the movement of the UE, wherein the indication of the updated configuration is transmitted to the UE.

\* \* \* \* \*